(12) United States Patent
Kunkel et al.

(10) Patent No.: US 8,752,094 B2
(45) Date of Patent: Jun. 10, 2014

(54) SYSTEMS AND METHODS FOR VIDEO-RICH NAVIGATION

(75) Inventors: Garard Kunkel, Yardley, PA (US); Michael D Ellis, Boulder, CO (US); Robert A Knee, Lansdale, PA (US); Jon P Radloff, Castle Rock, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 536 days.

(21) Appl. No.: 11/395,380

(22) Filed: Mar. 30, 2006

(65) Prior Publication Data

US 2006/0236342 A1  Oct. 19, 2006

Related U.S. Application Data

(60) Provisional application No. 60/667,200, filed on Mar. 30, 2005.

(51) Int. Cl.
| | |
|---|---|
| *H04N 5/445* | (2011.01) |
| *H04N 21/482* | (2011.01) |
| *H04N 21/431* | (2011.01) |
| *H04N 21/462* | (2011.01) |
| *H04N 21/472* | (2011.01) |

(52) U.S. Cl.
CPC ......... *H04N 5/44543* (2013.01); *H04N 21/482* (2013.01); *H04N 21/4316* (2013.01); *H04N 21/4622* (2013.01); *H04N 21/47214* (2013.01)
USPC .................. 725/52; 725/37; 725/53; 725/61; 725/86

(58) Field of Classification Search
CPC ............ H04N 5/44543; H04N 21/482; H04N 21/316; H04N 21/4622; H04N 21/42204
USPC ..................... 725/37, 52, 53, 61, 86
See application file for complete search history.

(56) References Cited

U.S. PATENT DOCUMENTS

| | | |
|---|---|---|
| 2,700,065 A | 1/1955 | Evans |
| 2,851,550 A | 9/1958 | Searcy |
| 2,856,474 A | 10/1958 | Norris |
| 3,879,332 A | 4/1975 | Leone |
| 4,001,554 A | 1/1977 | Hall et al. |
| 4,012,583 A | 3/1977 | Kramer |

(Continued)

FOREIGN PATENT DOCUMENTS

| | | |
|---|---|---|
| AU | 21592/88 | 3/1989 |
| CN | 101194505 | 6/2008 |

(Continued)

OTHER PUBLICATIONS

"A New Approach to Addressability," CableData product brochure, Cable Data, Sacramento, California, undated.

(Continued)

*Primary Examiner* — Jason Salce
(74) *Attorney, Agent, or Firm* — Ropes & Gray LLP

(57) ABSTRACT

Methods and systems are disclosed that provide a user with efficient video-rich navigation (VRN) of media assets in an interactive media guidance application, such as an interactive program guide. A user can select a displayed video asset and perform an action on the selectable video asset, for example, using a remote control. The manner in which the video assets are displayed and the actions enabled for the particular video assets are defined by screen data transmitted to the user equipment in a VRN data feed.

28 Claims, 26 Drawing Sheets

(56) References Cited

U.S. PATENT DOCUMENTS

| | | |
|---|---|---|
| 4,015,139 A | 3/1977 | Cleary et al. |
| 4,079,419 A | 3/1978 | Siegle et al. |
| 4,081,753 A | 3/1978 | Miller |
| 4,081,754 A | 3/1978 | Jackson |
| 4,156,850 A | 5/1979 | Beyers, Jr. |
| 4,162,513 A | 7/1979 | Beyers, Jr. et al. |
| 4,163,254 A | 7/1979 | Block et al. |
| 4,167,658 A | 9/1979 | Sherman |
| 4,170,782 A | 10/1979 | Miller |
| 4,225,884 A | 9/1980 | Block et al. |
| 4,228,543 A | 10/1980 | Jackson |
| 4,246,495 A | 1/1981 | Pressman |
| 4,247,743 A | 1/1981 | Hinton et al. |
| 4,288,809 A | 9/1981 | Yabe |
| 4,305,101 A | 12/1981 | Yarbrough et al. |
| 4,321,593 A | 3/1982 | Ho et al. |
| 4,348,696 A | 9/1982 | Beier |
| 4,355,415 A | 10/1982 | George et al. |
| 4,390,901 A | 6/1983 | Keiser et al. |
| 4,425,579 A | 1/1984 | Merrell |
| 4,429,385 A | 1/1984 | Cichelli et al. |
| 4,482,789 A | 11/1984 | McVey |
| 4,484,217 A | 11/1984 | Block et al. |
| 4,484,220 A | 11/1984 | Beetner |
| 4,488,179 A | 12/1984 | Krüger et al. |
| 4,488,764 A | 12/1984 | Pfenning et al. |
| 4,495,654 A | 1/1985 | Deiss |
| 4,510,623 A | 4/1985 | Bonneau et al. |
| 4,528,589 A | 7/1985 | Block et al. |
| 4,536,791 A | 8/1985 | Campbell et al. |
| 4,566,033 A | 1/1986 | Reidenouer |
| 4,573,072 A | 2/1986 | Freeman |
| 4,588,901 A | 5/1986 | Maclay et al. |
| 4,598,288 A | 7/1986 | Yarbrough et al. |
| 4,604,708 A | 8/1986 | Lewis |
| 4,605,964 A | 8/1986 | Chard |
| 4,605,973 A | 8/1986 | Von Kohorn |
| 4,620,229 A | 10/1986 | Amano et al. |
| 4,636,595 A | 1/1987 | Smock et al. |
| 4,647,735 A | 3/1987 | Sicher |
| 4,648,667 A | 3/1987 | Baumgart |
| 4,685,131 A | 8/1987 | Horne |
| 4,694,490 A | 9/1987 | Harvey et al. |
| 4,706,121 A | 11/1987 | Young |
| 4,718,107 A | 1/1988 | Hayes |
| 4,739,510 A | 4/1988 | Jeffers et al. |
| 4,750,213 A | 6/1988 | Novak |
| 4,768,229 A | 8/1988 | Benjamin et al. |
| 4,807,023 A | 2/1989 | Bestler et al. |
| 4,809,393 A | 3/1989 | Goodrich et al. |
| 4,823,385 A | 4/1989 | Hegendorfer |
| 4,855,611 A | 8/1989 | Isobe et al. |
| 4,862,268 A | 8/1989 | Campbell et al. |
| 4,885,775 A | 12/1989 | Lucas |
| 4,888,796 A | 12/1989 | Olivo, Jr. |
| 4,890,320 A | 12/1989 | Monslow et al. |
| 4,890,321 A | 12/1989 | Seth-Smith et al. |
| 4,903,031 A | 2/1990 | Yamada |
| 4,930,158 A | 5/1990 | Vogel |
| 4,930,160 A | 5/1990 | Vogel |
| 4,965,825 A | 10/1990 | Harvey et al. |
| 4,977,455 A | 12/1990 | Young |
| 4,994,908 A | 2/1991 | Kuban et al. |
| 4,995,078 A | 2/1991 | Monslow et al. |
| 5,001,554 A | 3/1991 | Johnson et al. |
| 5,021,916 A | 6/1991 | Hubbard |
| 5,033,085 A | 7/1991 | Rew |
| 5,036,537 A | 7/1991 | Jeffers et al. |
| 5,038,211 A | 8/1991 | Hallenbeck |
| 5,045,947 A | 9/1991 | Beery |
| 5,046,125 A | 9/1991 | Takizawa |
| 5,051,837 A | 9/1991 | McJunkin |
| 5,053,797 A | 10/1991 | Samuels et al. |
| 5,053,884 A | 10/1991 | Kamijyo |
| 5,056,139 A | 10/1991 | Littlefield |
| 5,068,734 A | 11/1991 | Beery |
| 5,075,771 A | 12/1991 | Hashimoto |
| 5,119,507 A | 6/1992 | Mankovitz |
| 5,168,353 A | 12/1992 | Walker et al. |
| 5,172,111 A | 12/1992 | Olivo, Jr. |
| 5,206,722 A | 4/1993 | Kwan |
| 5,210,611 A | 5/1993 | Yee et al. |
| 5,223,924 A | 6/1993 | Strubbe |
| 5,231,310 A | 7/1993 | Oh |
| 5,235,415 A | 8/1993 | Bonicel et al. |
| 5,247,364 A | 9/1993 | Banker et al. |
| 5,253,066 A | 10/1993 | Vogel |
| 5,253,067 A | 10/1993 | Chaney et al. |
| 5,260,778 A | 11/1993 | Kauffman et al. |
| 5,303,063 A | 4/1994 | Kim et al. |
| 5,317,391 A | 5/1994 | Banker et al. |
| 5,357,276 A | 10/1994 | Banker et al. |
| 5,371,795 A | 12/1994 | Vogel |
| 5,384,910 A | 1/1995 | Torres |
| 5,396,546 A | 3/1995 | Remillard |
| 5,425,101 A | 6/1995 | Woo et al. |
| 5,446,488 A | 8/1995 | Vogel |
| 5,465,113 A | 11/1995 | Gilboy |
| 5,477,262 A | 12/1995 | Banker et al. |
| 5,485,221 A | 1/1996 | Banker et al. |
| 5,485,518 A | 1/1996 | Hunter et al. |
| 5,519,780 A | 5/1996 | Woo et al. |
| 5,544,354 A | 8/1996 | May et al. |
| 5,548,345 A | 8/1996 | Brian et al. |
| 5,550,575 A | 8/1996 | West et al. |
| 5,557,724 A | 9/1996 | Sampat et al. |
| 5,559,548 A | 9/1996 | Davis et al. |
| 5,579,055 A | 11/1996 | Hamilton et al. |
| 5,583,560 A | 12/1996 | Florin et al. |
| 5,583,576 A | 12/1996 | Perlman et al. |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,619,274 A | 4/1997 | Roop et al. |
| 5,621,456 A | 4/1997 | Florin et al. |
| 5,629,733 A | 5/1997 | Youman et al. |
| 5,664,046 A | 9/1997 | Abecassis |
| 5,666,645 A | 9/1997 | Thomas et al. |
| 5,699,104 A | 12/1997 | Yoshinobu |
| 5,699,107 A | 12/1997 | Lawler et al. |
| 5,716,273 A | 2/1998 | Yuen |
| 5,751,335 A | 5/1998 | Shintani |
| 5,781,246 A | 7/1998 | Alten et al. |
| 5,805,763 A | 9/1998 | Lawler et al. |
| 5,815,145 A | 9/1998 | Matthews, III |
| 5,822,014 A * | 10/1998 | Steyer et al. ............... 725/41 |
| 5,880,768 A | 3/1999 | Lemmons et al. |
| 5,900,868 A | 5/1999 | Duhault et al. |
| 5,907,323 A | 5/1999 | Lawler et al. |
| 5,917,492 A | 6/1999 | Bereiter et al. |
| 5,973,683 A | 10/1999 | Cragun et al. |
| 5,978,649 A | 11/1999 | Kahn |
| 5,990,862 A | 11/1999 | Lewis |
| 6,020,930 A | 2/2000 | Legrand |
| 6,025,837 A | 2/2000 | Matthews, III et al. |
| 6,061,097 A | 5/2000 | Satterfield |
| 6,072,460 A | 6/2000 | Marshall et al. |
| 6,108,365 A | 8/2000 | Rubin et al. |
| 6,177,931 B1 * | 1/2001 | Alexander et al. ............... 725/52 |
| 6,240,555 B1 | 5/2001 | Shoff et al. |
| 6,275,268 B1 | 8/2001 | Ellis et al. |
| 6,295,646 B1 | 9/2001 | Goldschmidt Iki et al. |
| 6,331,877 B1 | 12/2001 | Bennington et al. |
| 6,373,528 B1 | 4/2002 | Bennington et al. |
| 6,405,371 B1 * | 6/2002 | Oosterhout et al. ............ 725/39 |
| 6,434,621 B1 | 8/2002 | Pezzillo et al. |
| 6,456,334 B1 | 9/2002 | Duhault |
| 6,519,011 B1 | 2/2003 | Shendar |
| 6,563,515 B1 | 5/2003 | Reynolds et al. |
| 6,564,378 B1 | 5/2003 | Satterfield et al. |
| 6,661,468 B2 | 12/2003 | Alten et al. |
| 6,671,424 B1 | 12/2003 | Skoll et al. |

(56) References Cited

U.S. PATENT DOCUMENTS

| | | |
|---|---|---|
| 6,732,371 B1 | 5/2004 | Lee et al. |
| 6,751,401 B1 * | 6/2004 | Arai et al. ............ 386/83 |
| 6,757,906 B1 | 6/2004 | Look et al. |
| 6,766,526 B1 | 7/2004 | Ellis |
| 6,772,435 B1 | 8/2004 | Thexton et al. |
| 6,785,904 B1 | 8/2004 | Franken et al. |
| 6,804,824 B1 | 10/2004 | Potrebic et al. |
| 6,865,746 B1 | 3/2005 | Herrington et al. |
| 6,898,762 B2 | 5/2005 | Ellis et al. |
| 6,938,208 B2 | 8/2005 | Reichardt |
| 6,948,183 B1 | 9/2005 | Peterka |
| 7,174,512 B2 * | 2/2007 | Martin et al. ........... 715/719 |
| 7,296,295 B2 | 11/2007 | Kellerman et al. |
| 7,757,252 B1 * | 7/2010 | Agasse ............ 725/41 |
| 8,453,175 B2 * | 5/2013 | Reid et al. ........... 725/45 |
| 2001/0031656 A1 | 10/2001 | Marshall et al. |
| 2002/0010932 A1 * | 1/2002 | Nguyen et al. ........... 725/51 |
| 2002/0026638 A1 | 2/2002 | Eldering et al. |
| 2002/0059593 A1 | 5/2002 | Shao et al. |
| 2002/0078449 A1 | 6/2002 | Gordon et al. |
| 2002/0157099 A1 | 10/2002 | Schrader et al. |
| 2002/0166122 A1 | 11/2002 | Kikinis et al. |
| 2003/0014752 A1 | 1/2003 | Zaslavsky et al. |
| 2003/0110499 A1 | 6/2003 | Knudson et al. |
| 2003/0159149 A1 | 8/2003 | Satterfield |
| 2003/0204848 A1 | 10/2003 | Cheng et al. |
| 2003/0217360 A1 | 11/2003 | Gordon et al. |
| 2004/0027380 A1 | 2/2004 | Takahashi |
| 2004/0070593 A1 | 4/2004 | Neely et al. |
| 2004/0117831 A1 | 6/2004 | Ellis et al. |
| 2004/0210935 A1 | 10/2004 | Schein et al. |
| 2005/0050070 A1 * | 3/2005 | Sheldon ............ 707/100 |
| 2005/0165918 A1 | 7/2005 | Wantanabe et al. |
| 2005/0235323 A1 | 10/2005 | Ellis et al. |
| 2005/0251843 A1 | 11/2005 | Walker |
| 2005/0283791 A1 | 12/2005 | McCarthy et al. |
| 2006/0173888 A1 | 8/2006 | Narahara et al. |
| 2006/0236342 A1 | 10/2006 | Kunkel et al. |
| 2007/0011702 A1 * | 1/2007 | Vaysman ............ 725/45 |
| 2007/0030391 A1 | 2/2007 | Kim et al. |
| 2007/0055989 A1 | 3/2007 | Shanks et al. |
| 2007/0154163 A1 | 7/2007 | Cordray |
| 2007/0157237 A1 | 7/2007 | Cordray et al. |
| 2007/0157249 A1 | 7/2007 | Cordray et al. |
| 2007/0199015 A1 | 8/2007 | Lopez et al. |
| 2007/0220551 A1 | 9/2007 | Shanks et al. |
| 2007/0250865 A1 | 10/2007 | Krakirian |
| 2007/0294734 A1 | 12/2007 | Arsenault et al. |
| 2008/0033992 A1 | 2/2008 | Sloo et al. |
| 2008/0066103 A1 | 3/2008 | Ellis et al. |
| 2008/0092157 A1 | 4/2008 | Walter et al. |
| 2008/0147650 A1 * | 6/2008 | Marsh ............ 707/5 |
| 2008/0163059 A1 | 7/2008 | Craner |
| 2008/0189740 A1 | 8/2008 | Carpenter et al. |
| 2008/0276283 A1 | 11/2008 | Boyer et al. |

FOREIGN PATENT DOCUMENTS

| | | |
|---|---|---|
| EP | 0 852 442 | 7/1998 |
| EP | 0 935 393 | 8/1999 |
| FR | 2678091 | 12/1992 |
| GB | 2209417 | 5/1989 |
| GB | 2210526 | 6/1989 |
| GB | 2215928 | 9/1989 |
| JP | 2001-503206 | 3/2001 |
| JP | 2004-194252 | 7/2004 |
| JP | 2008535411 | 8/2008 |
| WO | WO-8601962 | 3/1986 |
| WO | WO-8912370 | 12/1989 |
| WO | WO-9015507 | 12/1990 |
| WO | WO-9311638 | 6/1993 |
| WO | WO-9311639 | 6/1993 |
| WO | WO-9311640 | 6/1993 |
| WO | WO-96/37996 | 11/1996 |
| WO | WO 96/41477 | 12/1996 |
| WO | WO-9826584 | 6/1998 |
| WO | WO-9856176 | 12/1998 |
| WO | WO-9903271 | 1/1999 |
| WO | WO-9904561 | 1/1999 |
| WO | WO-9956466 | 11/1999 |
| WO | WO-00/05887 | 2/2000 |
| WO | WO-0008855 | 2/2000 |
| WO | WO-0018114 | 3/2000 |
| WO | WO-0033560 | 6/2000 |
| WO | WO-0033565 | 6/2000 |
| WO | WO-0245304 | 6/2002 |
| WO | WO-02/054765 | 7/2002 |
| WO | WO-02087219 | 10/2002 |
| WO | WO-03/026275 | 3/2003 |
| WO | WO 03/026275 | 3/2003 |
| WO | WO 2004/047440 | 4/2004 |
| WO | WO-2004047440 | 6/2004 |
| WO | WO-2006/081577 | 8/2006 |
| WO | WO-2006105480 | 10/2006 |
| WO | WO-2008024420 | 2/2008 |
| WO | WO-2008082461 | 7/2008 |

OTHER PUBLICATIONS

"Focus Highlight for World Wide Web Frames", IBM Technical Disclosure Bulletin, Nov. 1997, pp. 89-90.

"Weststar and Videotoken Network Present The CableComputer" (Plaintiff's Exhibit 334).

Addressable Converters: A New Development of Cable Data, Via Cable, vol. 1, No. 12, Dec. 1981, Cable Data, Sacramento, California.

Brugliera, Vito, "Digital On-Screen Display—A New Technology for the Consumer Interface," Symposium Record Cable Sessions of the 18th International Television Symposium & Technical Exhibition, Jun. 1993, pp. 571-586.

CableComputer User's Guide, bearing a date of Dec. 1985 (Plaintiff's Exhibit 289).

CableData, Roseville Consumer Presentation, Mar. 1986.

Committee on Commerce, "Communications Act of 1995," XP-002100790 Jul. 1995, pp. 1-4.

Daniel F. Walsh Jr., Timing Considerations in RF Two Way Data Collection and Polling, Jerrold-Applies Media Lab, 1989 NCTA Technical Papers, pp. 47-56, 1989.

Daniel H. Smart, innovative Aspects of a Switched Star Cabled Television Distribution System, British Cable Services Limited, 1987 NCTA Technical Papers, pp. 26-35, 1987.

Family Safe Media, Compare Profanity Filters, available at http://www.familysafemedia.com/compare_filters.html (printed Mar. 14, 2007).

Family Safe Media, TV Guardian Summary, available at http://www.familysafemedia.com/tv_guardian/ tv_guardian_summary-html (printed Mar. 14, 2007).

Federal Communications Commission, In the Telecommunications Act of 1996, Public Law 104-104, effective Feb. 8, 1996, in Section 551, "Parental Choice in Television Programming," XP-002100791.

Gary Libman, Times Staff Writer Chaining the Channels, A New Generation of Television Blocking Systems Allows More Options for Parent, Seeking to Control Kids' Viewing, Los Angeles Times, Aug. 9, 1993.

Gregory F. Vaeth, John Feras, Enertec, Inc, The Addressable Controller of the Future, *General Instruments/Jerrold Communication,* 1990 NCTA Technical Papers, pp. 274-279, 1990.

Jerrold Communications Publication, "Cable Television Equipment," dated 1992 and 1993, pp. 8-2.1 to 8-6 and 8-14.1 to 8-14.3.

M/A-COM, Inc., "Videocipher II Satellite Descrambler Owners Manual," dated prior to Feb. 1986.

Michael Dufresne, "New Services: An Integrated Cable Network's Approach, Videotron Communication LTEE," *Technical Papers of NCTA 31st Annual Convention & Exposition,* pp. 156-160 (1982).

Richard G. Merrell, Mack S. Daily, An Auto-Dialer Approach to Pay-Per-View Purchasing, Zenith Electronics Corporation, Glenview, Illinois, 1989 NCTA Technical Papers, pp. 34-38, 1989.

Roseville City Council Presentation, bearing a date of Mar. 13, 1985 (Defendant's Exhibit 26).

(56) References Cited

OTHER PUBLICATIONS

Singha, Edward Apurba, "An interactive solution for TV viewers," The Daily Star, Apr. 3, 2009, http//www.the dailystar.net/pf_story.php?nid=463, printed Apr. 2, 2009, 2 pps.

StarSight Telecast Inc. User's Guide, pp. 1-93 (1994).

T. Rzeszewski et al., "A Microcomputer Controlled Frequency Synthesizer for TV." Reprinted from *IEEE Trans. Consum. Electron.* vol. CE-24, pp. 145-153 (1978).

Tech Notes: Product Updates from M/A-COM Cable Home Group, "Videocipher Owner's Manual Update," Issue No. 6, Feb. 1986.

\* cited by examiner

VRN-1.001 TEMPLATE - 2.21.05

VRN-1.001 TEMPLATE - 2.21.05

VRN-1.001 TEMPLATE - 2.21.05

Chunk Definition 1

CHUNK DEFINITION 1

US 8,752,094 B2

SYSTEMS AND METHODS FOR VIDEO-RICH NAVIGATION

CROSS-REFERENCE TO OTHER PATENT APPLICATIONS

This application claims the benefit to U.S. provisional Patent Application No. 60/667,200, filed Mar. 30, 2005, the contents of which are hereby incorporated herein by reference in their entirety.

BACKGROUND OF THE INVENTION

The present invention is directed towards systems and methods for providing "Video-Rich Navigation" (VRN) in an interactive media guidance application.

In current interactive media guidance applications, a user is presented with program guide data in a form of a neutral menu showing the available program mix and other available assets, such as Video-On-Demand (VOD), High-Definition Television (HDTV), Pay-per-View (PPV), Digital Video Recorder (DVR), music channels, digital cable and digital broadcast satellite (DBS), textual information, etc. A user is typically presented with a main menu and clicks through several options before arriving at a program the user may be interested in.

Due to the ever increasing number of channels and services, subscribers are faced with a daunting challenge of simplifying and enhancing their TV viewing experience. Network operators need ways to make viewers aware of and interested in their programming choices, and easier approaches are needed to seamlessly combine offerings from multiple network operators in ways transparent to the user.

It would therefore be desirable to provide systems and methods to present guidance for video assets to a user in a more user-friendly manner. It would also be desirable to enable network operators and service providers to display video pages with screen elements that provide selectivity, interactivity and enhanced functionality to make the display screen more easily navigable.

SUMMARY OF THE INVENTION

Video-Rich Navigation (VRN) enables users to access services and/or assets from video-rich menu screens in an interactive television application system. VRN screens (also sometimes referred to herein as "pages") may include both traditional menu buttons and "VRN buttons." VRN buttons are interactive buttons and include video screen elements, or cells. VRN screens may be provided to the user in a VRN channel and/or may be assembled by filling in the cells from analog or digital video broadcast channels or from composite video streams (e.g., MPEG-2) composed of several digital channels. The VRN channels are tunable by the user equipment, for example, using multiple tuners or selecting a digital channel from the composite video stream. VRN screens may also access data from video-on-demand (VOD) streams to create on-demand VRN portals (e.g., using VOD broadcast barker functionality). As used herein, a "VRN channel" refers to either a tunable channel or VOD stream. A VRN channel or multiple linked VRN channels may provide a set of features referred to herein as a "VRN Application". An exemplary application with one or more VRN channels may provide interactive program guide features, interactive news features, interactive sports application features, or video-on-demand features.

The look and feel of a VRN screen may be defined by screen data provided to user equipment. For example, screen data may include content identifiers that uniquely identify the on-screen elements on a VRN page. The screen data may includes template definitions and control data, for example, in the form of "chunks" that define the content displayed on the VRN page and interactive functions of the screen elements.

Screen data may also include unique identifiers for programs, channels, VOD programs, graphics, etc. Screen data may further specify the display of graphics, on-screen text, and the behavior and response to user input of selectable items in a VRN screen.

The screen data may be provided to the user equipment in-band or out-of-band. If carried in-band, screen data may be retrieved as needed, but may be cycled at a rate sufficient to display the VRN screens in a reasonable time when the screens are accessed by a user (such as when tuned to or retrieved on demand). For example, data may be cycled at least once per second and as fast as twice per second. If carried out-of-band, screen data may be stored locally by user equipment (e.g., a set top box).

A VRN client on the user equipment executes the screen data to provide a VRN application. VRN applications may be executed automatically when an end user equipment is powered on, executed automatically when a specific channel is tuned, accessed by a user from one or more menus of an interactive television application also running on user equipment (such as an interactive program guide, or IPG), or accessed by a user via buttons from a remote control device.

In one illustrative embodiment, for example, video assets for a VRN page are included in a video feed as a composite video. A template defines the position of each asset within the video, and defines the positions of other non-video assets within a VRN page. The VRN client generates the VRN page by overlaying non-video assets, such as a background and menu options, onto the video feed leaving at least some of the video assets viewable for use as VRN buttons. As the VRN client receives user navigation commands, it moves a highlight region among the selectable elements of the display. When the user selects an element, such as a video element, the VRN client performs an action associated with that element as defined in the screen data.

Further embodiments, features and modifications are disclosed more fully in the U.S. provisional patent application Ser. No. 60/667,200, filed Mar. 30, 2005, to which this application claims priority and the contents of which, including Appendices A through P, are included hereby in this application by reference in their entirety.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF PREFERRED EMBODIMENTS

The systems and methods described herein describes certain embodiments of providing and navigating video content in form of a video rich navigation (VRN) page displayed, for example, on a TV display or other type of monitor or visual communication device. The VRN page includes a plurality of suitably arranged cells and can be launched, for example, when the TV display and/or tuner device are turned on. The cells on the VRN page can be populated with video assets from broadcast channels, video on demand (VOD), pay-per-view (PPV), advertising channels, recorded assets (DVR), locally stored assets, web-sites, and the like. The cells may be any suitable size and/or shape and may be located at any suitable location on the display screen. The cells may include text, still images, full motion video images, symbols, logos, or a combination of these or other suitable elements. In the following description, the terms "VRN Page" and "VRN Screen" will be used interchangeably and denote a full screen display, for example, on a TV monitor.

Figure 1:
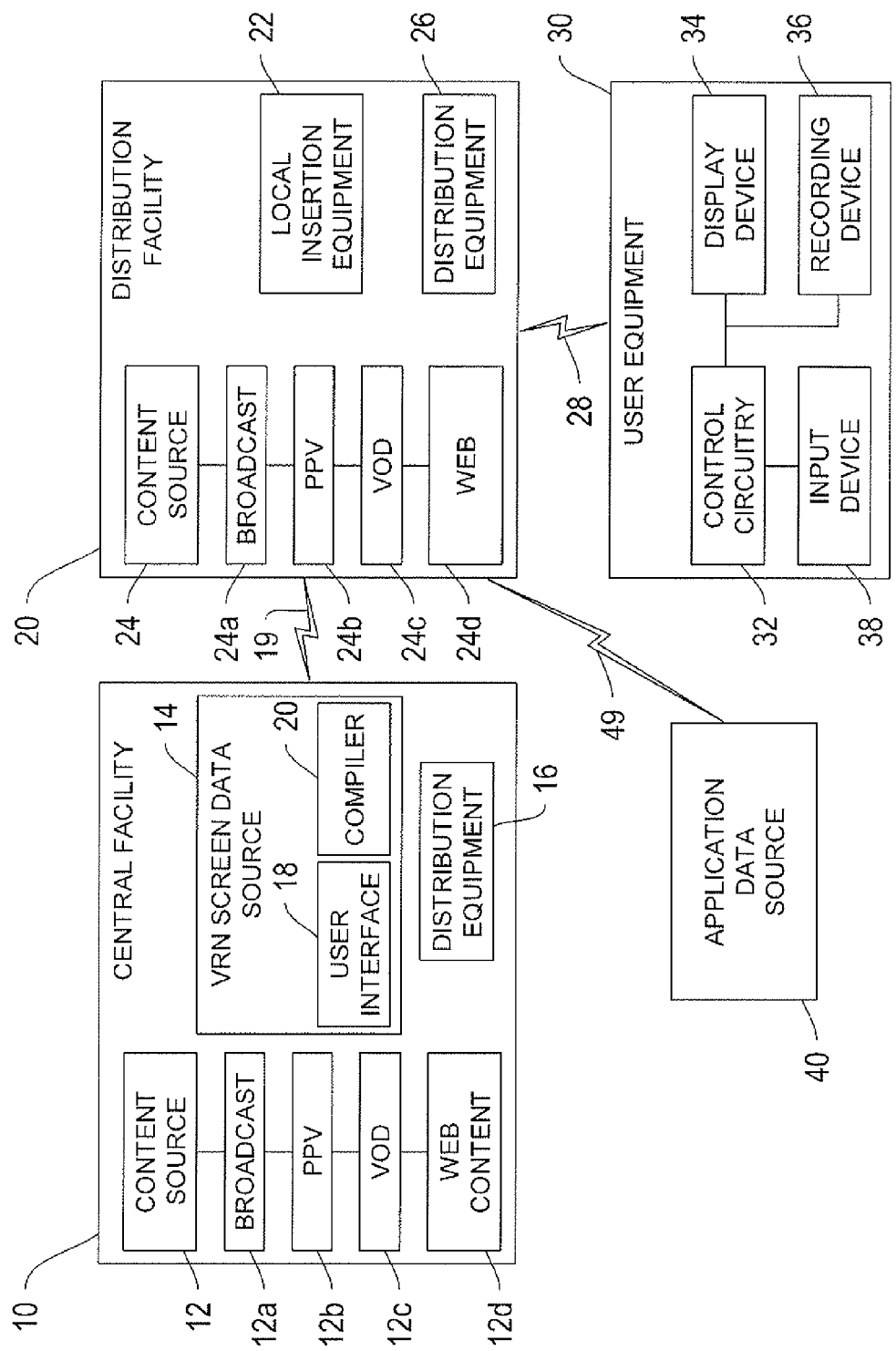
FIG. 1 shows an illustrative system architecture for providing VRN.

FIG. 1 shows an illustrative system architecture for providing VRN. Central facility 10 includes content source 12, VRN screen data source 14 and distribution equipment 16. Content source 12 may be any equipment suitable for producing or generating video content for VRN screens. The video content from content source 12 may be in analog or digital form. In other embodiments, content source 12 may be in a facility other than the central facility 10, and may also provide content for distribution as regular television channels (e.g., broadcast programming, VOD content, etc.).

VRN screen data source 14 may be any equipment suitable for generating VRN screen data. For example, VRN screen data source 14 may be a personal-computer (PC) based system or a workstation. User interface 18 may be any suitable interface, such as a windows-based or Unix-based graphic user interface (GUI), which allows, for example, an operator to define VRN definitional data, such as files, and synchronize the VRN screen data of the definitional data with content from content source 12. The user interface may allow an operator, for example, to specify transitions between distinct configuration specifications for selectable items in synchronization with video content. The user interface may also allow an operator to define control data which control, inter alia, the appearance, functionality, and interactivity of the screen elements, as well as the content or asset displayed in a screen element.

In some embodiments, the user interface may allow an operator to assign a higher precedence to initial configuration specifications for new video content when the VRN screen transitions between distinct content elements. This will allow new data associated with such content to be transmitted in time. For example, for the change when a video window changes from ESPN to CNN, the new VRN screen data associated with CNN may be given precedence over other data. VRN screen changes may be scheduled by, for example, specifying an activate time and/or a deactivate time, or by specifying version numbers, in the VRN screen data.

Compiler 20 may be any suitable combination of hardware and software for compiling the VRN screen data of the definitional files into binary VRN screen data. In some embodiments, definitional data may be stored in a directly usable form and may not require compilation.

Distribution equipment 16 is any suitable equipment for distributing VRN screens from content source 12 and VRN screen data from VRN screen data source 14 over communications path 19 to distribution facility 20, and further over communication path 28 for distribution to user equipment 30. Central facility 10 may distribute the screens and screen data to multiple distribution facilities 20, but only one has been shown to avoid over-complicating the drawing. In other embodiments, central facility 10 may distribute the VRN screens and/or screen data to users directly. Distribution equipment 16 may distribute the VRN screens and VRN screen data in any suitable analog or digital format and over any suitable communications path (e.g., satellite or terrestrial broadcast, the Internet, etc.). VRN screen data may be distributed in-band or out of band from the VRN screens.

Distribution facility 20 may be any facility (e.g., a head-end) suitable for receiving the VRN screens and screen data and distributing the screens and screen data to user equipment 30. There may be multiple instances of user equipment 30, but only one instance has been shown to avoid over-complicating the drawing. Distribution facility 20 may have content source 24 and local insertion equipment 22 for allowing a local operator to insert content and data into the VRN screens or VRN screen data, respectively, and compile VRN screen data into binary format for transmission (if required). Local insertion equipment 22 may run, for example, on a local version of user interface 18 and compiler 20.

Distribution equipment 26 may distribute the VRN screens and VRN screen data in any suitable analog or digital format and over any suitable communications path to user equipment 30 (e.g., broadcast, cable, the Internet, etc.). The communication paths 19, 49 and 28 may include, for example, a satellite path, a fiber-optic path, a cable path, an Internet path, or any other suitable wired or wireless path. For example, VRN screens may be provided as MPEG-2 feeds. VRN screen data may be distributed in-band or out of band from the VRN screens. Distribution equipment 26 may provide the VRN screens (and if in-band the VRN screen data) as tunable analog or digital channels, or as VOD streams (both of which are referred to as VRN channels). The VRN channels provide the users of user equipment 30 with a set of interactive features that make up a VRN application.

In some embodiments, distribution facility 20 may provide the VRN channel full-time over a given analog or digital channel. Alternatively, distribution facility 20 may provide VRN channels part-time.

Distribution facility 20 may provide one or more VRN applications to user equipment 30. User equipment 30 may include any equipment suitable for providing an interactive television experience including the VRN applications provided by distribution facility 20. User equipment 30 may include television equipment such as a television, set-top box, recording device, video player, user input device (e.g., remote control, keyboard, mouse, touch pad, touch screen and voice recognition interface), or any other device suitable for providing an interactive multimedia experience. For example, user equipment 30 may include a DCT 2000, 2500, 5100, 6208 or 6412 set-top box provided by Motorola, Inc. In some embodiments, user equipment 30 may include computer equipment, such as a personal computer with a television card (PCTV). In some embodiments, user equipment 30 may include a gaming system, a portable electronic device, such as a portable DVD player, a portable gaming device, a cellular telephone, a PDA, a music player (e.g., MP3 player), or any other suitable portable or fixed device.

In the example of FIG. 1, user equipment 30 includes at least control circuitry 32, display device 34, recording device 36, and user input device 38, which may be implemented as separate devices or as a single device. A VRN client is implemented on user equipment 30 to provide the VRN application.

Control circuitry 32 is adapted to receive user inputs from input device 38 and execute the instructions of the VRN client (and therefore the VRN application) and any other interactive television applications running on user equipment 30. Control circuitry 32 may include one or more tuners (e.g., analog or digital tuners), decoders (e.g., MPEG decoders), processors (e.g., Motorola 68000 family processors), memory (i.e., RAM and hard disks), communications circuitry (e.g., cable modem circuitry), input/output circuitry (e.g., graphics circuitry), connections to the various devices of user equipment 30, and any other suitable component for providing analog or digital television programming and interactive television features. In one embodiment, control circuitry 32 may be included as part of one of the devices of user equipment 30 such as, for example, part of recording device 36, display device 34, or any other suitable device (e.g., a set-top box, television, video player, etc.).

Users may have access to multimedia sources 12a, 12b, 12c, and web content 12d from the central facility 10 and/or to similar sources 24 (which may or may not include similar multimedia sources and web content, 24a, 24b, 24c, 24d) using a cable television network, a local area network (LAN), a wireless network, or any other suitable means or combination thereof. In some embodiments, the equipment of a plurality of users may be connected to each other using any suitable means.

Display device 34 may be any suitable device such as, for example, a television monitor, a computer monitor, or a display incorporated in user equipment 30 (e.g., a cellular telephone or music player display). Display device 34 may also be configured to provide for the output of audio.

Optional recording device 36 may be a personal video recorder (PVR), digital video recorder (DVR), video cassette recorder (VCR), DVD-recorder, or any other suitable video recorder. Recording device 36 may include one or more tuners.

The VRN client implemented on user equipment 30 may be a stand alone client or part of an interactive television application, such as an interactive television program guide (IPG). The interactive television application may receive interactive television application data from application data source 40. As shown in FIG. 1, the data may be received via distribution facility 20 over communication path 49. Alternatively, the data may be received by user equipment 30 from application data source 40 over a direct communication path (not shown). Application data source 40 may be part of central facility 10 (not shown). In some embodiments, the interactive television application data may include elements that are referenced in the VRN screen data for inclusion in the VRN application such as graphics, logos, etc. For example, VRN templates may be provided as part of the interactive television application data.

User equipment 30 may execute multiple interactive television applications. In some of such embodiments, the VRN client may provide an application program interface (API) to allow the other interactive television applications to launch the VRN application or access VRN application features. If the VRN client is part of a particular interactive television application, such as an IPG, that application may provide an API to the other applications so that they may launch or access the VRN application. In still other approaches, an interactive television application may provide an API to the VRN application. This may provide the VRN application access to various features of the interactive television application. For example, user equipment 30 may provide an IPG. The VRN screen data may specify that the VRN application call the IPG (or features of an IPG when, for example, the VRN client is an IPG) to, for example, provide program listings having certain characteristics (e.g., listings for a given channel, service or time slot).

As mentioned above, the VRN features must be enabled on a VRN client and VRN data, such as the screen data and the control data, must be available to the VRN client for a user to take advantage of the VRN features. Accordingly, when a user tunes to a broadcast channel or a video stream, such as a PPV or VOD service, the VRN client may first determine whether the channel or video stream includes VRN screen data. This determination may be made automatically (because the channel or video stream has not yet been identified to the guide as a VRN channel), or performed only when the channel is identified as a VRN channel. If the channel or video stream does not have VRN screen data, the VRN client may continue to monitor the channel or VOD asset to detect such data if it is subsequently transmitted. If the VRN screen data is received while the VRN client is in the idle state (such as when the user is watching a program or a streamed asset) or FLIP state (such as when the user is tuning and the VRN client is an IPG), then the VRN client may exit the idle or FLIP state and launch a VRN application. If the VRN client stops receiving VRN data for a period of time (e.g., 15 seconds), the VRN client may revert to the idle state.

The transmitted screen data may include references to templates. However, templates are not required for a VRN application. Templates are definitional documents (or their compiled equivalent) that are received and may be stored by the VRN client. In some embodiments, templates may be hard coded and included as part of the VRN client. Templates define the screen appearance of a VRN application, but contain placeholders for content instead of the actual content or information identifying the content. A template identifier can be used instead of the actual template definitions to identify a template, for example, a template stored on the client. The VRN client uses the template identifier to retrieve a template from memory and then populates the template based on content identifiers in the VRN screen data. This may reduce the amount of data being transmitted. The VRN client changes templates and thereby the appearance of the VRN screen according to the change in the template identifiers. The template identifiers and/or template definitions can be transmitted to the client via a data feed other than the VRN screen data feed.

The following sections describe illustrative embodiments of VRN applications. When the user equipment, such as a set top box or display, is first switched on and a VRN video feed and VRN screen data are available, a VRN Home Page may be displayed. The elements and behaviors described below are described more comprehensively in relation to a displayed Home Page, but that is only for purposes of illustration. Other VRN screens, which may or may not be Home Pages, such as other VRN screens accessible from a VRN Home Page, will be described following the description of the exemplary Home Page, with only the different page layout and control functionality highlighted.

Home pages (and other VRN screens) may include a number of elements, either interactive or not interactive, that occupy defined regions on the display (or VRN page). In one embodiment, the content of the various VRN elements on the VRN screen can be transmitted with the VRN video feed. Other attributes of the VRN screen elements, such as the size, color scheme, and interactive functions associated with the VRN screen elements can be transmitted to the VRN client via the VRN screen data. The VRN screen data may cause certain unsupported VRN screen elements (e.g., VRN screen elements with associated content that is either unavailable or blocked) or regions on the VRN screen to be omitted, obscured, or grayed out. Interactive VRN screen elements, also referred to as VRN buttons, can be highlighted and selected. If the end user navigates to a specific interactive element (e.g., by using the arrow keys on a remote control device), the interactive element will be visually highlighted in some fashion. If the end-user "selects" a highlighted interactive element (e.g., by pressing the "OK" button on a remote control device), the system will display a specific tunable channel, VOD clip, VOD screen, IPG screen, or another interactive media guidance application, based on selection behavior specified for the interactive element in the VRN screen data.

Figure 2:
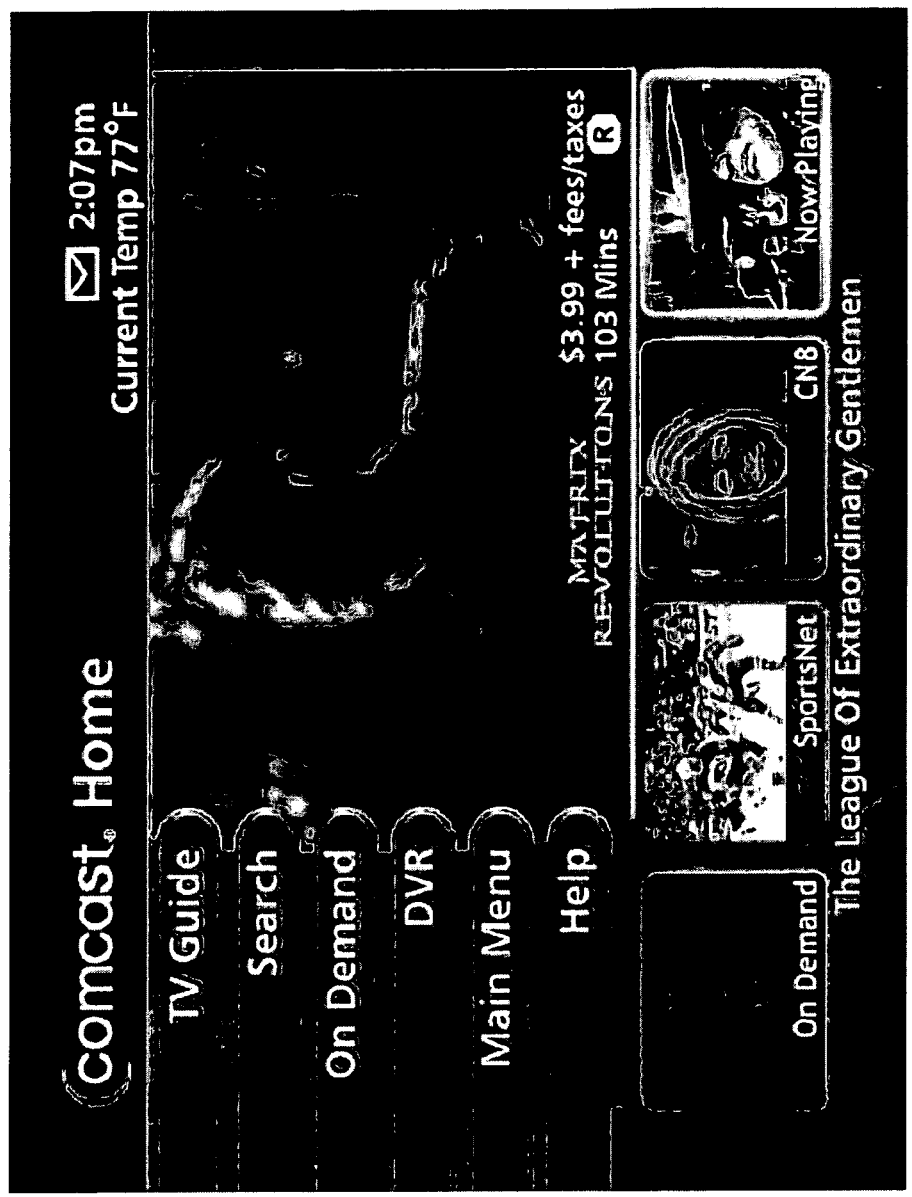
FIG. 2 shows an illustrative VRN screen implemented as a Home Page.
Figure 3:
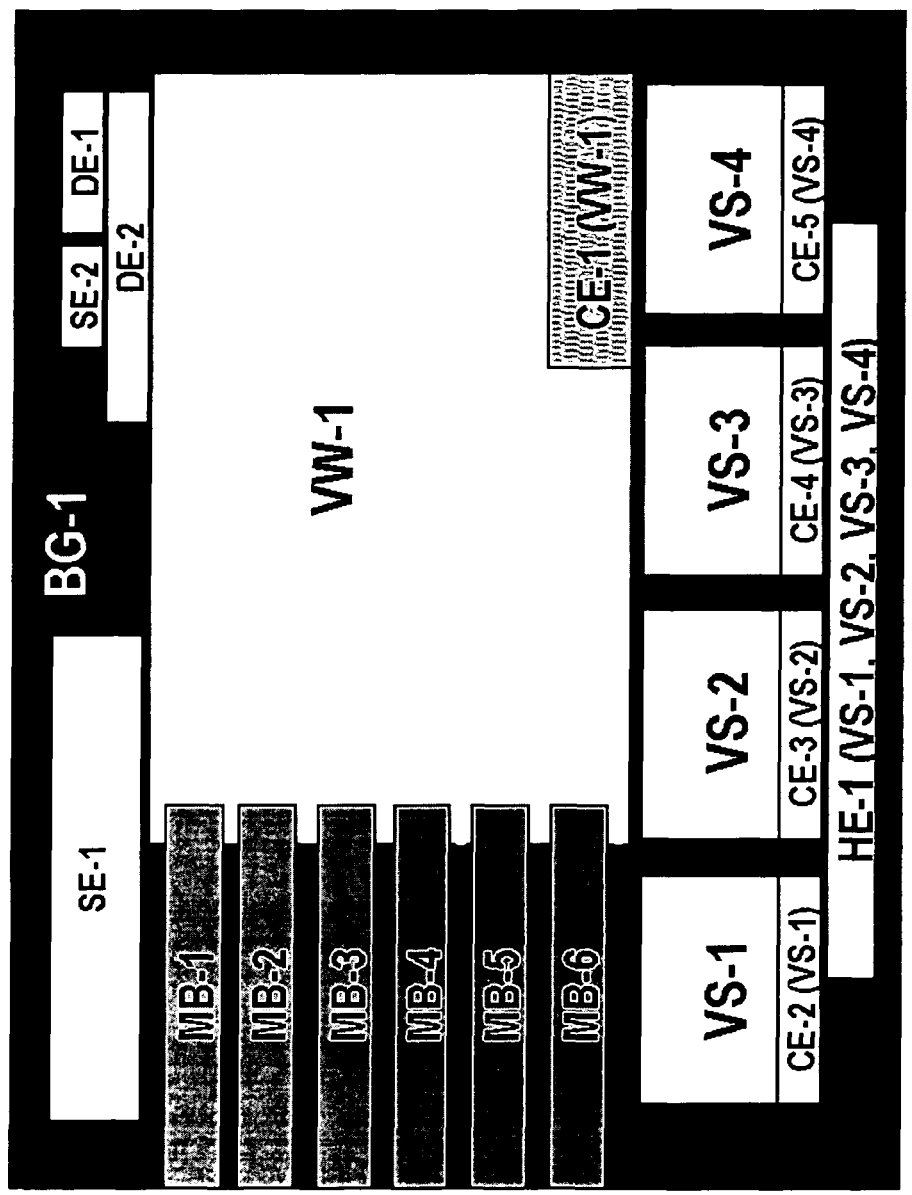
FIG. 3 shows a wire frame representation of the VRN screen of FIG. 2.

The following description of VRN screens is organized as follows:

Section I addresses the general setup of a Home Page, with Section I.A describing illustrative Home Page elements and illustrative Home Page behavior. Section I.B describes illustrative Home Page responses to remote control keys. Section I.C describes illustrative IPG functions called by a Home Page application. Section I.D describes illustrative IPG behavior for providing Home Page access through an IPG. Section II describes the properties and use of templates. Section III gives examples of illustrative additional VRN screens based on templates. Section IV introduces the use of control data or chunks. Details of the processes relating to the generation of templates, generation of VRN screens and selectable video elements, generation of interactive and non-interactive buttons (or VRN screen elements), and the use the VRN screen and control data are illustrated in the exemplary process flows depicted in FIGS. 21 through 24. Setup of an Illustrative Home Page I.A Description of Illustrative Home Page Elements FIG. 2 shows an illustrative VRN screen for a Home Page with various available programming elements having interactive and non-interactive features and content. FIG. 3 is a corresponding exemplary template in form of a wire frame with elements ("elements") of populated with full-motion video and other contents.

Elements of the screen can be of the following types:
Still image—Identified in the VRN screen data by, for example, filename.
VOD video clip—Identified in the VRN screen data by, for example, provider ID and asset ID.
Live video source—Identified in the VRN screen data by, for example, source ID.
Video playlist—Sequence of VOD video clips and/or live video sources.
Graphic—Described in the VRN screen data by, for example, metadata.
Text block—Described in the VRN screen data by, for example, metadata.
Audio track—Identified in the VRN screen data by, for example, a cable plant audio PID.

These are only illustrative, as any other suitable elements may be used. In some embodiments supporting two-way communications for example, an input form may be provided to allow users to submit a form via HTML to an application server.

Table 1 describes the various elements referenced in FIGS. 2 and 3.

TABLE 1

| ID | Description |
|---|---|
| BG-1 | Background |
| SE-1 | Static Element 1: Home Page Logo. |
| SE-2 | Static Element 2: Message Indicator |
| DE-1 | Dynamic Element 1: Time |
| DE-2 | Dynamic Element 2: Temperature |
| VW-1 | Video Window 1: Main Video Window |
| CE-1 | Child Element 1: Main Video Window Info |
| MB-1 to MB-6 | Menu Buttons 1-6 |
| VS-1 to VS-4 | Video Swatches 1-4 |
| CE-2 to CE-5 | Child Elements 2-5: Video Swatch Titles for Video Swatches 1-4, respectively |
| HE-1 | Highlight Element 1: Video Swatch Info for currently highlighted Video Swatch |

I.A.1 Background (BG-1)

A Background is a full-screen, non-interactive element that sits behind all other elements in the template. In FIG. 3, BG-1 represents the Background element. This element is assumed to contain the blue graphic backdrop and black graphic header block shown in FIG. 2. Note that in some approaches the Home Page Logo (SE-1) (or other logos) could be embedded in the Background element.

The Background element may be any one of the following:
Still image
VOD video clip
Live video source
Video playlist The Background element has no special behavior associated with it. Changes of the Background element may be scheduled in the VRN screen data based on date and/or day part.

I.A.2 Home Page Logo (SE-1)

The Home Page Logo is a non-interactive, static element (hence the designation "SE-1" in FIG. 3), meaning that it remains the same while the Home Page is displayed. (In embodiments employing templates, described below in Section III, static elements remain the same in all instances of a specific template). If it is desired that the Home Page Logo element change to coincide with changes of the Background element, it may be simpler in some embodiments to embed the Home Page Logo in the Background element, as mentioned in the previous section. The Home Page Logo element is a still image. In embodiments where the screen of FIG. 2 is used for a non-Home Page, this element may be replaced by a different logo.

I.A.3 Message Indicator (SE-2)

The Message Indicator is an interactive, static element. While the Message Indicator element itself does not change, it has a special behavior called conditional visibility; it is only visible if the subscriber has one or more unread messages in an IPG Message Center. The Message Indicator element has no special highlight behavior. Selection behavior is to display an IPG Message Center screen. The Message Indicator element could be either a still image or a text block (i.e. an icon).

I.A.4 Time (DE-1)

The Time is an interactive, dynamic element (hence the designation "DE-1" in FIG. 3) that changes to reflect the current time on the STB (set-top box) clock. The Time element has no special highlight behavior. Selection behavior is to display the IPG TV Timers screen. The Time element is a text block.

I.A.5 Temperature (DE-2)

The Temperature is an interactive, dynamic element that changes to reflect the current temperature provided for the cable system. This element is a concatenation of two distinct text strings—one containing the text "Current Temperature", and another containing the actual temperature reading. The Temperature element has no special highlight behavior. Selection behavior is to display an IPG Weather screen. The Temperature element is a text block.

I.A.6 Main Video Window (VW-1)

The Main Video Window is an interactive, dynamic element that may, for example, cycle through a playlist of VOD video clips. The Main Video Window cycles continuously through the playlist, which could contain any number of VOD video clips; however, the playlist may contain a small number (a dozen or fewer) that an MSO wishes to promote. The audio track associated with the Main Video Window playlist is audible to the subscriber by default The Main Video Window element has no special highlight behavior. Selection behavior may be to display an information screen specifically for the VOD program that the current VOD video clip (at the time of selection) is promoting. Alternate selection behavior may be to display a VOD sub-menu containing all of the VOD programs promoted by VOD video clips in the playlist. The Main Video Window element is a VOD video clip or video playlist. Changes of the Main Video Window playlist may be scheduled based on date and/or day part.

I.A.7 Main Video Window Info (CE-1)

The Main Video Window Info is a non-interactive child element (hence the designation "CE-1" in FIG. 3) of the Main Video Window. The Main Video Window Info element changes to match the current VOD video clip playing in the Main Video Window. This element is a concatenation of several metadata elements associated with the current VOD video clip—specifically, a "price" metadata element, a "price info" metadata element, a "duration" metadata element and a "rating" metadata element. The Main Video Window Info element is a text block.

I.A.8 Menu Buttons (MB-1 to MB-6)

The Menu Buttons are interactive elements that may be customized and modified as desired by an MSO (Multiple System Operator, i.e., a company that operates more than one cable system). In FIG. 3, MB-1 through MB-6 represent the Menu Button elements. These six elements are logically combined into a "menu group." A menu group may have an anchor point in a corner of a specified screen area. The menu group, as a whole, has special behaviors. First, if any of the Menu Button elements is undefined (empty), it will not be displayed, and other Menu Button elements in the menu group should shift upward in the display as required.

Further, each Menu Button element can be defined to have conditional visibility, based on one or more system and/or session properties. For example, the DVR Menu Button shown in FIG. 2 (MB-4 in FIG. 3) may only be visible when the user's equipment has DVR capability. Otherwise, the DVR Menu Button would not be visible, and again the other Menu Button elements in the menu group would shift upward in the display as required.

Other examples of properties that might drive conditional visibility for a Menu Button element include STB support for specific interactive television applications, or lack of subscriber entitlement for a specific tunable channel. An alternate approach to conditional visibility of Menu Button elements might be conditional selection behavior. For example, the DVR Menu Button, for a subscriber without DVR capability, may display a screen promoting DVR-enabled STBs.

Yet another example of conditional visibility of a menu button is displaying a menu button (or other selectable element) in response to a user highlighting an element associated with a program. In this way only options associated with the program are provided. These options may be displayed in, for example, a tool bar.

The Menu Button elements have no special highlight behavior. Selection behavior may be configurable based on MSO (Multiple System Operator—a company that operates more than one cable system). The visible Menu Button elements could be any one of the following:

Still image (with text embedded)
Still image+text block overlay
Graphic+text block overlay Changes of the Menu Button elements may be scheduled based on date and/or daypart. Scheduled changes will appear in the VRN screen data for the Home Page. The VRN screen data for the menu groups may also specify the screen area and anchor point for the menu group.

I.A.9 Video Swatches (VS-1 to VS-4)

Video Swatches are interactive, dynamic elements that can be customized and modified as desired by the MSO. In some embodiments, each of the Video Swatch elements may be driven by a playlist of VOD video clips, as with the Main Video Window element. In other embodiments, the Video Swatch elements may represent a single theme (and hence will use a single VOD video clip or video playlist), with consistent selection behavior.

Video swatches may have a number of special behaviors. First, each distinct Video Swatch element may have the ability to visually alternate between a "cover image" when not highlighted, and video content (VOD video clip, live video source or video playlist) when highlighted. This is referred to herein as a "hybrid interactive element." Second, the audio track, for any Video Swatch element that has an associated audio track, becomes audible to the subscriber when the Video Swatch is highlighted (or selected). Finally, the four Video Swatch elements are logically combined into a "highlight group," much like the Menu Button elements. However, this group definition drives the behavior of a separate, "highlight element" described in the Video Swatch Info section below. Selection behavior for the Video Swatch elements may be configurable by MSO.

The Video Swatch elements may be any one of the following:

Still image
VOD video clip
Live video source
Video playlist
Still image ("cover image") transitioning to VOD video clip, live video source or video playlist when the Video Swatch element is highlighted (hybrid).

Changes of the Video Swatch elements/element playlists may be scheduled based on date and/or daypart.

I.A.10 Video Swatch Titles (CE-2 to CE-5)

The Video Swatch Titles are non-interactive child elements (hence the designations "CE-2" through "CE-5" in FIG. 3) of the Video Swatches (VS-1 through VS-4, respectively). The Video Swatch Title elements change to match the current still images, VOD video clips, live video sources or video playlists displayed in their respective Video Swatch elements. The title displayed may be from a metadata element associated with each of the respective Video Swatch elements.

The Video Swatch Title elements are text blocks. Also note that, as pictured, the Video Swatch Title elements may contain a transparent black "bar graphic" beneath the text block. This bar graphic could be pre-produced and embedded in a VOD video clip; however rendering of this bar graphic for a live video source would need to be executed in real time.

I.A.11 Video Swatch Info (HE-1)

The Video Swatch Info is a non-interactive, dynamic highlight element (hence the designation "HE-1" in FIG. 2) associated with the Video Swatch highlight group. The Video Swatch Info element behaves much like a child element; however, it has a highlight group as its parent, versus having a single element as its parent. If one of the Video Swatch elements is highlighted, the Video Swatch Info element changes to reflect the currently highlighted Video Swatch element. The Video Swatch Info element also has conditional visibility. It is only visible if one of the Video Swatch elements is highlighted. The information displayed may be taken from a single metadata attribute that has a unique value for each of the Video Swatch elements. The Video Swatch Info element is a text block.

I.A.12 Audio

Audio is an implied element in FIGS. 2 and 3. All VOD video clips and live video sources, whether shown in the Main Video Window or in a Video Swatch, have an associated audio track. In some embodiments, Home Pages may identify exactly one default audio track. In the sample Home Page of FIG. 2, the audio track associated with the Main Video Window (VW-1) is the default audio track. However, for any Video Swatch element having an associated audio track, if that Video Swatch is highlighted, its associated audio track will become audible to the user. If no Video Swatch elements are highlighted, the default audio track will be audible to the subscriber. If no interactive elements with an associated audio track are currently highlighted, the Home Page application will make the default audio track audible for the user. If any interactive element having an associated audio track is currently highlighted, the Home Page application will make the audio track associated with the highlighted interactive element audible for the user. Audio tracks may be provided in different PIDs of a single MPEG stream, or in different MPEG streams. In some embodiments, audio may be provided as MIDI data or text that is synthesized to speech.

I.A.13 Illustrative Highlight And Selection Behavior

The Home Page application (and other VRN applications) may identify interactive elements to be highlighted by default when the Home Page application is initially executed. If the Home Page application loses focus but remains active, the Home Page application may retain knowledge of the last highlighted interactive element. If, after losing focus, the Home Page application regains focus, the Home Page application may restore the highlight to the last highlighted interactive element. If the Home Page application becomes inactive (exits), the Home Page application may not retain knowledge of the currently highlighted interactive element.

The Home Page application (or other VRN applications) may specify one or more special highlight behaviors to be invoked when an interactive element is navigated to ("highlighted"). For example, when an interactive element having an associated audio track is highlighted, the audio track for the highlighted interactive element will be made audible for the subscriber. When a hybrid interactive element is highlighted, the "cover image" associated with the hybrid interactive element may be replaced with the VOD video clip, live video source or video playlist associated with the hybrid interactive element.

The Home Page application (or other VRN applications) may provide for the association of a distinct group of interactive elements (a "highlight group") with a separate "highlight element." A highlight element associated with the highlight group displays specific metadata for the currently highlighted interactive element in the highlight group. If none of the interactive elements in a highlight group is currently highlighted, any highlight element associated with the highlight group will not be displayed.

The Home Page application (or other VRN applications) may provide "conditional selection behavior" for an element based on criteria specified for that element in the VRN screen data. Selection behavior for any element having criteria for conditional selection behavior may be determined by evaluation of the specified criteria at the time of selection. Criteria specified for conditional selection behavior may be limited to element, session or system attributes that can be ascertained at the time of selection.

I.A.14 Additional Illustrative Home Page Display Behaviors

The Home Page application (or other VRN applications) may support one or more of the following additional display behaviors.

The Home Page application (or other VRN applications) may provide "conditional visibility" for an element based on criteria specified for that element. Any element having criteria for conditional visibility may only be visible to the subscriber if the specified criteria are met. Criteria specified for conditional visibility may be limited to element, session or system attributes that can be ascertained while executing the Home Page application. Entire screens may have conditional visibility. For example, screens may vary based on where a VRN application was accessed from.

The Home Page application (or other VRN applications) may dynamically display elements based on parent-child relationships between elements. A child element has one or more metadata attributes associated with its respective parent element. As a specific parent element changes, its child elements change to reflect the metadata attribute(s) associated with the new parent element.

The Home Page application (or other VRN applications) may dynamically display elements based on system attributes such as the STB clock, and the temperature.

The VRN client may mask VRN button of a Home Page (or other VRN applications) when the VRN button is associated with a channel or source that is not supported in the local channel map. The VRN client may obtain the local channel map via an API call to another interactive television application (e.g., an IPG), may receive the local channel maps as VRN screen data or, in embodiments where the VRN client is an IPG, may receive the local channel map as IPG data. The VRN client may also mask a button when, for example, its functionality is not supported on the user's equipment (e.g., the VRN client will not display a DVR button for a non-DVR STB). When a VRN button is masked its audio and video may be imperceptible to the user. The VRN screen data may provide alternate display configurations for masked VRN buttons.

In some embodiments, the VRN client may display a screen saver after the Home Page (or other VRN applications)

is inactive for a configurable interval. If the VRN screen is VOD, the VRN client may simply tune the user's equipment to the last linear channel tuned after the screen saver is provided for a period of time. If the VRN screen is broadcast, the screen saver may not time out.

I.A.15 Home Page Element Transition Scheduling

The Home Page application (or other VRN applications) may transition between multiple, distinct specifications for an element based on a pre-defined schedule of specifications for that element. The scheduling may be by, for example, date and day part or date and time. The VRN screen data for the application may include a pre-defined schedule of specifications to be used for each distinct element.

The Home Page applications (or other VRN applications) may select between distinct specifications for Home Page application elements at the time of VRN application startup. In some embodiments, the VRN application will not transition between element specifications during a single instance of execution.

I.B Illustrative Responses to Remote Control Keys

The number of keys supplied on remote controls that control the functionality of the settop box and define screen commands and responses to user input has increased substantially. Not only do the remote controls operate several different components of the user equipment, but they also activate increasingly more complex functions. Table 2 defines illustrative behavior of a remote control with 45 control keys, of which most are active while a Home Page application, such as the one described herein, is active and in focus. The actual number of keys can be greater, since not all keys may be active. Some of the behaviors below assume that the Home Page has access to IPG functions (this is described below in Sections I.C and I.D).

TABLE 2

| # | Key | Screen Focus | Behavior (HPK-#) |
|---|---|---|---|
| 1 | Power | Any | The application turns off the STB. |
| 2 | Volume Up | Any | The application increases the volume level and updates the volume bar display to reflect the new volume level. |
| 3 | Volume Down | Any | The application decreases the volume level and updates the volume bar display to reflect the new volume level. |
| 4 | Mute | Any | The application toggles the audio and the mute indicator on or off. |
| 5 | Channel Up | Any | The application exits, the next higher channel is selected based on the channel number currently displayed on the LEDs, and the appropriate Flip banner is displayed. |
| 6 | Channel Down | Any | The application exits, the next lower channel is selected based on the channel number currently displayed on the LEDs, and the appropriate Flip banner is displayed. |
| 7 | Bypass | Any | Inactive. |
| 8 | Menu | Any | The application loses focus and requests that the IPG display the Quick Access Menu. |
| 9 | Guide | Any | The application loses focus and requests that the IPG display an IPG Grid Listings screen, beginning with the current ½ hour block, and with the lowest channel in the channel map. |
| 10 | Music | Any | The application loses focus and requests that the IPG display a Channel Listing screen, filtered to include "audio" channels only. |
| 11 | Themes | Any | The application loses focus and requests that the IPG display the Search Menu screen. |
| 12 | Search | Any | The application loses focus and requests that the IPG display the Search Menu screen. |
| 13 | Settings | Any | The application loses focus and requests that the IPG display the Setup Menu screen. |
| 14 | Exit | Any | The application exits and requests that the IPG tune to the last tuned channel. |
| 15 | Last | Any | The application exits and requests that the IPG tune to the last tuned channel. In some embodiments, pressing the last key navigates in reverse through all of the pages selected in the view application. Once the first page is reached, the next pressing of the last button will return the user to the last tuned channel. The VRN application may remember, for example, 20 pages. When the user reaches a VRN application page from another interactive television application using the last key, no previous navigation is remembered and a default page is displayed with a default highlight. The VRN application will not remember any previous navigation. |
| 16 | Right Arrow | Any | The right arrow key moves the highlight to the nearest interactive element to the right. (Note: Navigation between interactive elements is explicitly defined for each distinct Home Page application template). |
| 17 | Left Arrow | Any | The left arrow key moves the highlight to the nearest interactive element to the left. |
| 18 | Up Arrow | Any | The up arrow key moves the highlight to the nearest interactive element above the current highlight. |
| 19 | Down Arrow | Any | The down arrow key moves the highlight to the nearest interactive element below the current highlight. |
| 20 | OK | Any | The application executes the selection behavior as defined for the currently highlighted interactive element. |
| 21 | Digits 0-9 | Any | The application exits and requests that the IPG tune to the channel indicated by the digit entry and display the appropriate Flip banner. |
| 22 | Scroll Up | Any | Inactive. |
| 23 | Scroll Down | Any | Inactive. |

TABLE 2-continued

| # | Key | Screen Focus | Behavior (HPK-#) |
|---|---|---|---|
| 24 | Day Forward | Any | Inactive. |
| 25 | Day Back | Any | Inactive. |
| 26 | Help | Any | Inactive. |
| 27 | Info | Any | Inactive. |
| 28 | Favorite | Any | The application exits and normal behavior for pressing the Favorite key while tuned to a channel is invoked. |
| 29 | Lock | Any | The application loses focus and requests that the IPG invoke the lock process for the Home Page channel. |
| 30 | Record | Any | Inactive. |
| 31 | Stop | Any | Inactive. |
| 32 | Pause | Any | Inactive. |
| 33 | Play | Any | Inactive. |
| 34 | Rewind | Any | Inactive. |
| 35 | Fast Forward | Any | Inactive. |
| 36 | PPV | Any | The application loses focus and requests that the IPG display a Listings By Time and Channel screen, filtered to display PPV programs only. |
| 37 | Letters A-Z | Any | Inactive. |
| 38 | VOD | Any | The application exits and request that the IPG display the VOD Main Menu. |
| 39 | Return to Live | Any | Inactive. |
| 40 | Skip Forward | Any | Inactive. |
| 41 | Replay | Any | Inactive. |
| 42 | A | Any | Inactive. |
| 43 | B | Any | Inactive. |
| 44 | C | Any | Inactive. |
| 45 | Digital Recordings | Any | The application loses focus and requests that the IPG display the IPG Digital Recordings Listings screen. |

In addition to illustrative behaviors described above, the Home Page application (or other VRN application) may support configurable buttons. For example, on-screen and physical buttons (i.e., remote control or STB buttons) may have various behaviors specified by the VRN screen data. In some embodiments, highlight behavior may be configurable. For example, moving a cursor over an on-screen button can trigger a behavior such as instant info text. In some embodiments, selection behavior may be configurable (e.g., whether a button launches a particular screen). In some embodiments, exception behavior may be configurable.

I.C Illustrative IPG Functions Called by a Home Page Application

In some embodiments, an IPG may reside on user equipment 30 (FIG. 1) and provide an API to the Home Page application so that the Home Page application may access IPG functions (whether or not the IPG is a VRN client). The Home Page application may request that the IPG perform any of the following actions in response to user input:

Tune to a specified source channel (specified by, e.g., source ID or channel call letters).

Tune to the last source that was tuned prior to the Home Page channel. When a user tries to tune to a channel (other than a Home Page channel), the Home Page application may exit.

Play a specified VOD video clip (specified by, e.g. provider ID and/or asset ID).

Display an information screen for a specified VOD asset (specified by, e.g. provider ID and/or asset ID).

Display a VOD Main Menu screen.

Display a specified VOD Sub-Menu screen.

Launch a specified VRN application other than the IPG. Upon launching the other application, the Home Page application may exit.

Display an IPG Grid Listings screen, beginning with the current half hour, and with the lowest channel number in the channel map.

Display an IPG Grid Listings screen, with channels filtered by any service attribute supported in IPG filter strings.

Display an IPG Listings by Time and Channel screen, beginning with the current half hour, and with the lowest channel number in the channel map.

Display an IPG Listings by Time and Channel screen, with programs filtered by any service, schedule or program attribute supported in IPG filter strings.

Display an IPG Listings by Channel and Time screen, beginning with the lowest channel number in the channel map, and with the current half hour.

Display an IPG Listings by Channel and Time screen, with programs filtered by any service, schedule or program attribute currently supported in IPG filter strings.

Display an IPG Listings by Title screen.

Display an IPG Listings by Title screen, with programs filtered by any service, schedule or program attribute currently supported in IPG filter strings.

Display an IPG Channel Listings screen.

Display an IPG Channel Listings screen, with channels filtered by any service attribute currently supported in IPG filter strings.

Display an IPG Mini Guide overlay, beginning with the current half hour, and with the lowest channel number in the channel map.

Display an IPG Main Menu screen.

Display an IPG Search Menu screen.

Display an IPG Setup Menu screen.

Display an IPG Message Center screen.

Display an IPG TV Timers screen.

Display an IPG Weather screen.

Display an IPG Digital Recordings Listings screen.

Display other IPG screens as defined by an MSO.

Customize the VRN application based on IPG settings.

I.D Illustrative IPG Behavior for Providing Home Page Access

In some embodiments, an IPG implemented on user equipment 30 (FIG. 1) may provide access to a VRN Home Page or other VRN applications, such as when the IPG is the VRN client. This section describes illustrative behavior for an IPG in such embodiments. The Home Page channel may be included as a STET source in the IPG. STET sources are sources that have a single, generic program title and description. As with other sources, the IPG may tune to a Home Page channel. For example, the IPG may automatically tune to the Home Page application when the STB is powered on. The IPG may also make the Home Page channel accessible to the end user through the following access points:

Direct tuning to Home Page channel. If the channel is not authorized the Home Page may not be launched.

Interactive selection of the Home Page channel in any IPG channel listing, grid or mini-guide display. The IPG may not launch the Home Page if the Home Page is tuned in a Scaled Video Window.

Access from a "Home Page" button in the IPG Main Menu.

Access from a "Home Page" button in the IPG Quick Access Menu (QAM).

Tuning to Home Page channel via the "last" button on the remote control.

If the IPG automatically powers on the STB to execute a TV timer scheduled event (such as a recording), however, the IPG will not tune to the Home Page channel. If the IPG automatically tunes to the Home Page channel when the STB is powered on, whatever channel was tuned when the STB was last powered off may be accessed by the user from a "last" button on the remote control.

If the STB has dual tuners, the IPG will use Tuner 1 to automatically tune to the Home Page channel. If the IPG uses Tuner 1 to automatically tune to the Home Page channel, then whatever channel was tuned on Tuner 1 when the STB was last powered off may be accessed by the user from the "last" button on the remote control.

If a parental control lock has been placed on the Home Page channel, the IPG will display the parental control PIN entry overlay whenever a tune to the Home Page channel is attempted, instead of tuning directly to the Home Page channel. The IPG will only tune to the Home Page channel if the correct parental control PIN is entered.

When a user tunes to the Home Page channel, the IPG will not display the IPG Flip Bar overlay. If the Home Page application is active but the IPG has the current focus, the IPG will cause the Home Page application to exit in response to a user invoking a tune to any channel other than the Home Page channel, or in response to a user invoking the execution of another interactive television application.

If the Home Page application is active but the IPG has the current focus, the IPG will exit and cause the Home Page application to regain focus in response to a user invoking a tune to the Home Page channel, the user selecting a menu button representing the Home Page application, or the user pressing the "exit" key on the remote control device while still tuned to the Home Page channel.

When a broadcast channel is in the VRN state, the IPG may disable DVR trick play functionality with the exception of the stop command. If a VOD asset is in a VRN state, the IPG may disable VOD trick play functionality with the exception of the stop command.

II. VRN Templates

VRN templates are VRN definitional documents (or their binary equivalents) that define the look and behavior of VRN screens. The exemplary wire frame depicted in FIG. 3 may be defined by a template. Templates may define, for example, the location (x, y and z axis), appearance, size and shape of selectable items such as menu buttons, VRN buttons, or other static or dynamic selectable graphic elements, FIGS. 2 and 3. VRN templates may also define instant information areas and may associate such areas with selectable elements.

VRN templates may also specify the navigation between selectable elements. Templates may, for example, define a default navigation behavior. This default navigation behavior may be overridden by VRN screen data received by the VRN client. This may occur only for particular keys, such as OK, Up Arrow, Down Arrow, Left Arrow, Right Arrow, scroll up and scroll down, as will be described below. Templates may, for example, define one selectable element as the default highlight position.

When there are VRN buttons in a VRN screen, a template may identify one of the buttons as the default audio source. When there are no VRN buttons the default audio is the default audio of a broadcast source, e.g., a channel from which a user accessed the VRN application, or a default audio channel. This will override any other default audio settings on the user equipment, e.g., default audio set in an IPG setup feature.

VRN templates may also define the location (x, y and z axis), appearance, size and shape of non-selectable elements, such as backgrounds, MSO logos, time elements, message center elements, or any other non-selectable elements, e.g., those described above in connection with the illustrative Home Page of FIGS. 2 and 3.

Templates include placeholders for visual elements of VRN screens. These placeholders are populated by a VRN client based on control data for the visual elements contained in the VRN screen data. The visual elements themselves may be included in the VRN screen data, pre-stored on the user equipment, or obtained on-demand by the VRN client.

VRN templates are received by the VRN client using any suitable approach. For example, they may be periodically transmitted in the VRN data feed. In other approaches, the VRN client may download templates on demand from a server at distribution facility 20 (such as when an unknown template is defined in the VRN screen data). In some approaches, the templates may be embedded as part of the VRN client. When the VRN client is an IPG, the templates may be provided as IPG data. VRN screen data identifies the applicable template for the VRN client using an identifier. The VRN client detects that identifier and, after retrieving the relevant template from memory, acquires the VRN screen data required to render all of the selectable and non-selectable items specified in the template. The VRN client resolves the placeholders of the template with the asset (content) identifiers in the VRN screen data, and retrieves the actual visual elements. The actual visual elements may be provided as part of the VRN data, or as part of data for another application on user equipment 30 (FIG. 1) such as an IPG. Some visual elements may be included as part of the video content, and may be shown or blocked as indicated by the VRN screen data.

Rendering a VRN screen requires having all of the data to populate the template. In some embodiments, the VRN client may not make the video and audio for the VRN screen available until sufficient VRN screen data has been acquired to render a complete VRN screen. If sufficient VRN data are not received before a timeout value (e.g., 30 seconds) expires, the VRN client may display a "feature not available" overlay. When the VRN client is an IPG, for example, the VRN channel may be displayed once the IPG database acquires local configuration data identifying the VRN channel. In embodiments where the VRN screen data is provided in a VOD stream, the VRN client may make the VRN screen visible to the user without imposing any delay due to insufficiency of VRN screen data. When VRN data disappears (or is not validated within a timeout period), the VRN client may block audio and video.

In some embodiments, channels and VOD streams are VRN enabled only part-time. In such embodiments, the VRN client may dynamically enable and disable the VRN application based on the presence or absence of valid VRN screen data. When the VRN application is disabled, audio and video for a channel is provided as it normally would by the user equipment.

III. Additional VRN Screens

A number of additional exemplary VRN screens which can be displayed independent of the Home Page or can be accessed from the Home Page will now be described with reference to FIGS. 4-17. These illustrative screens and associated wire frames are described herein as defined by templates, but such VRN screens may, in other embodiments, be provided without using templates. Furthermore, these illustrative VRN screens of FIGS. 4-17 are described below as provided by an IPG VRN client. In other embodiments, other VRN clients may be used.

Figure 4:
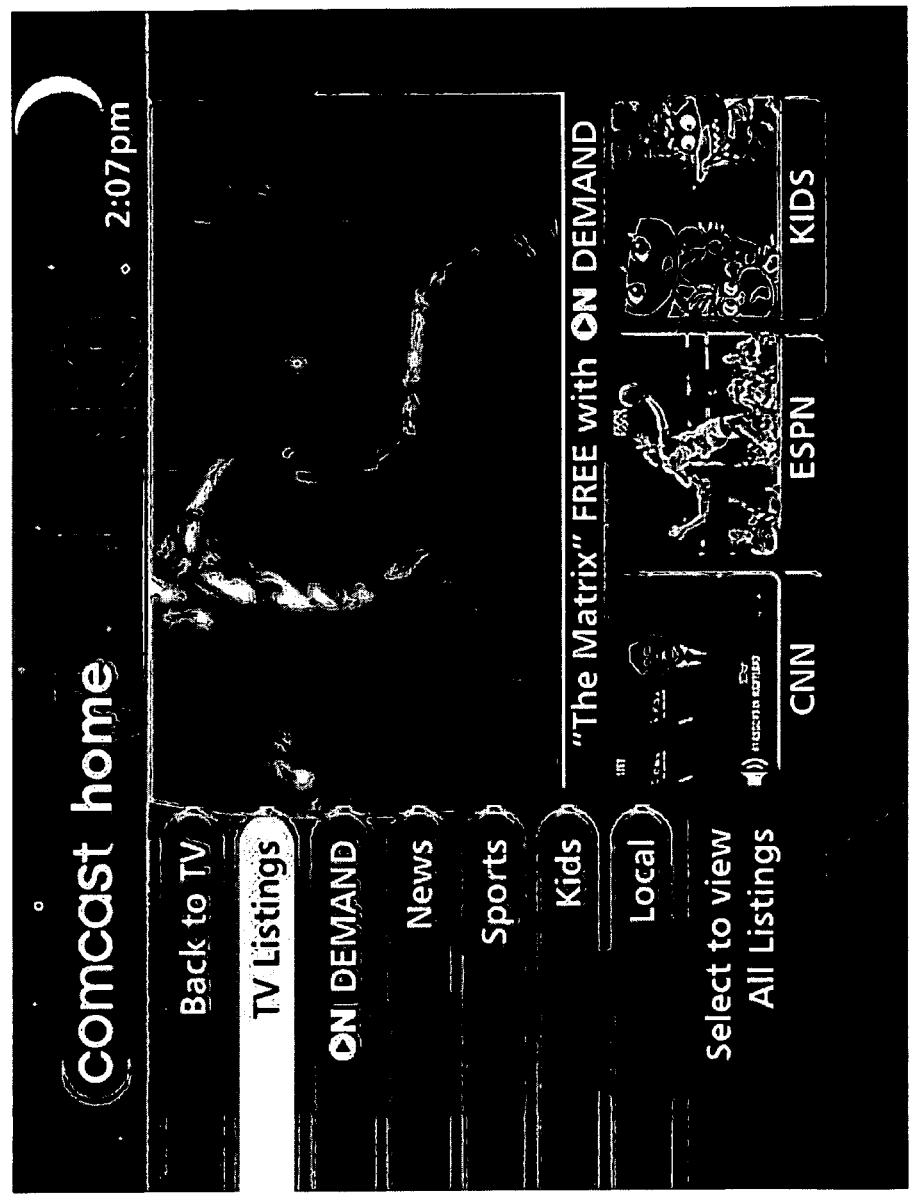
FIGS. 4-17 show different embodiments of illustrative VRN screens and associated wire frame templates.
Figure 5:
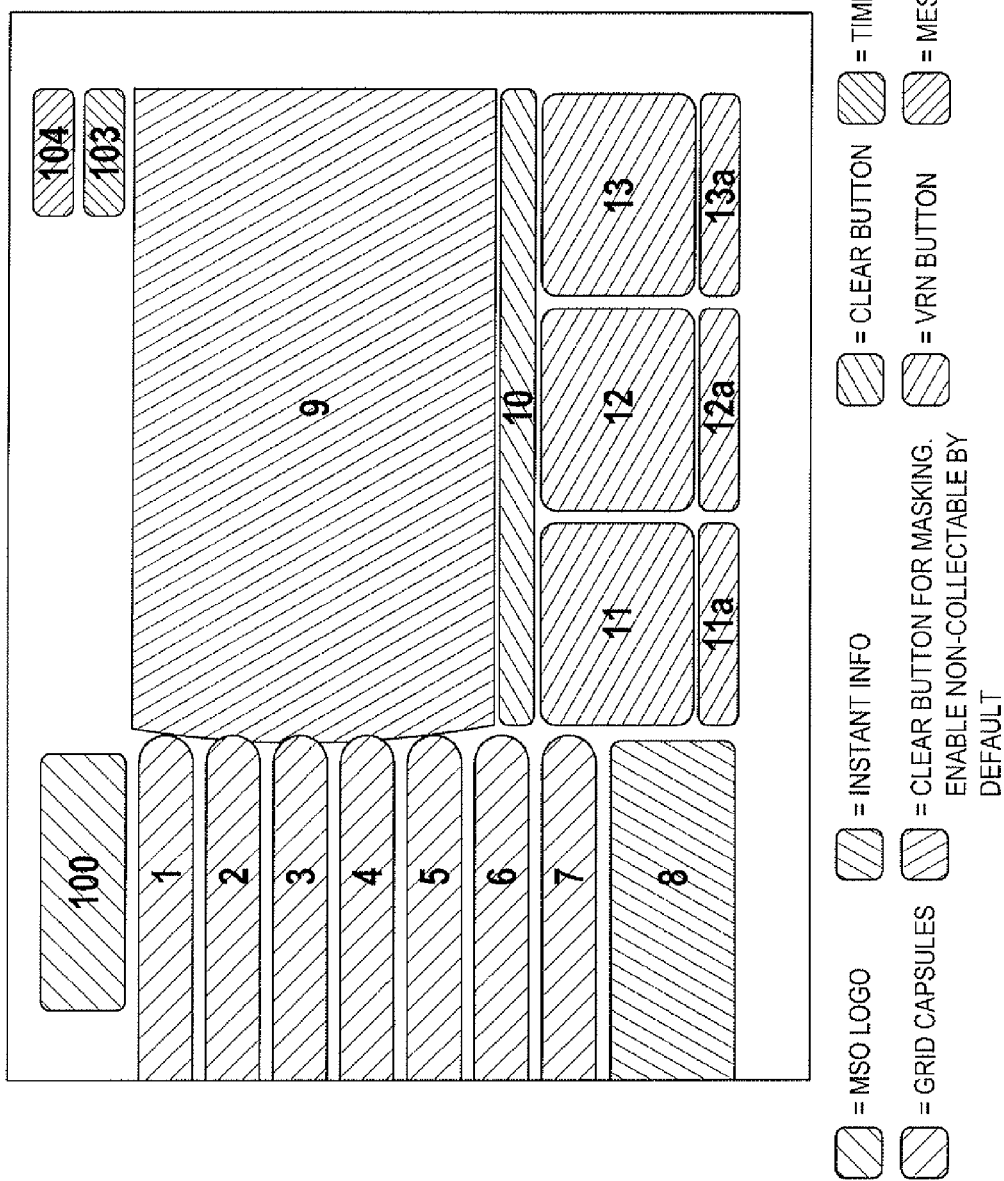
Figure 6:
Figure 7:
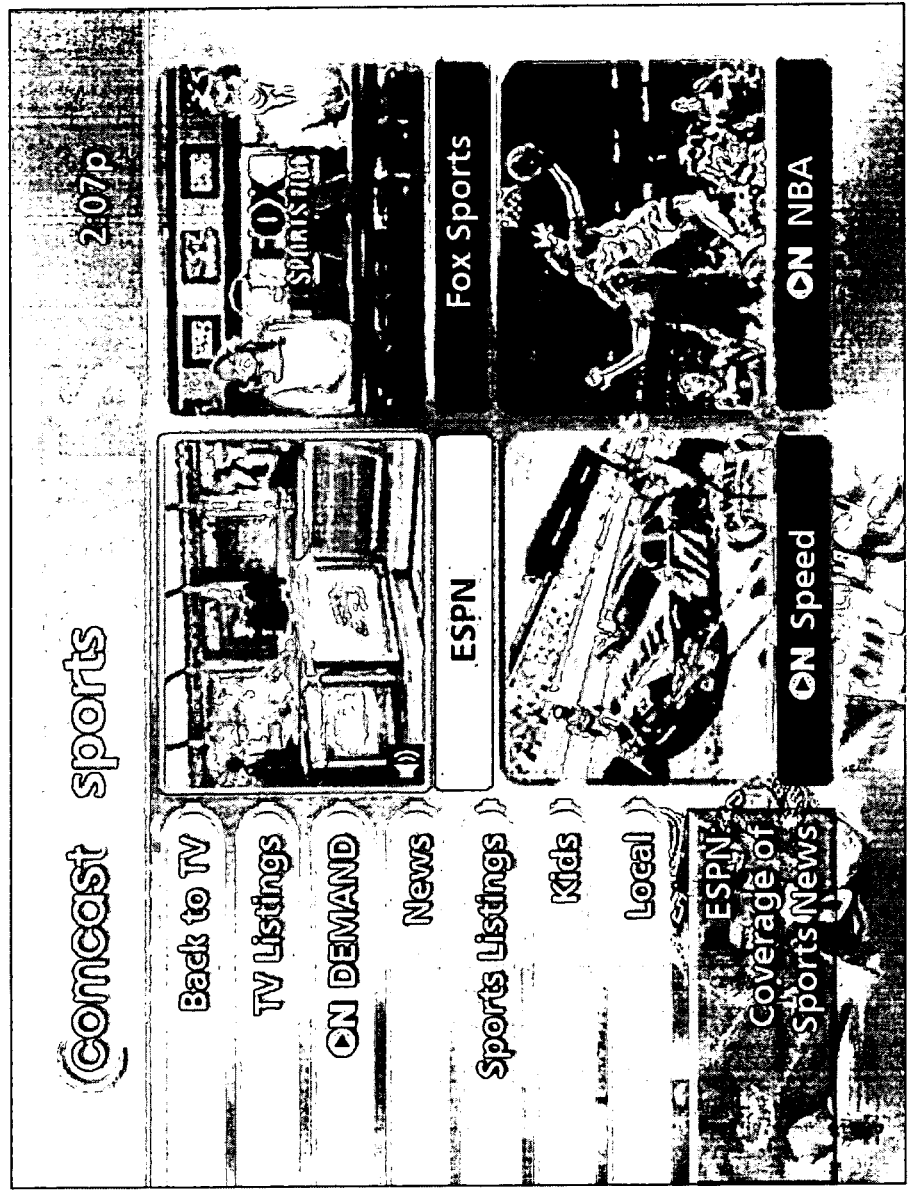
Figure 8:
Figure 9:
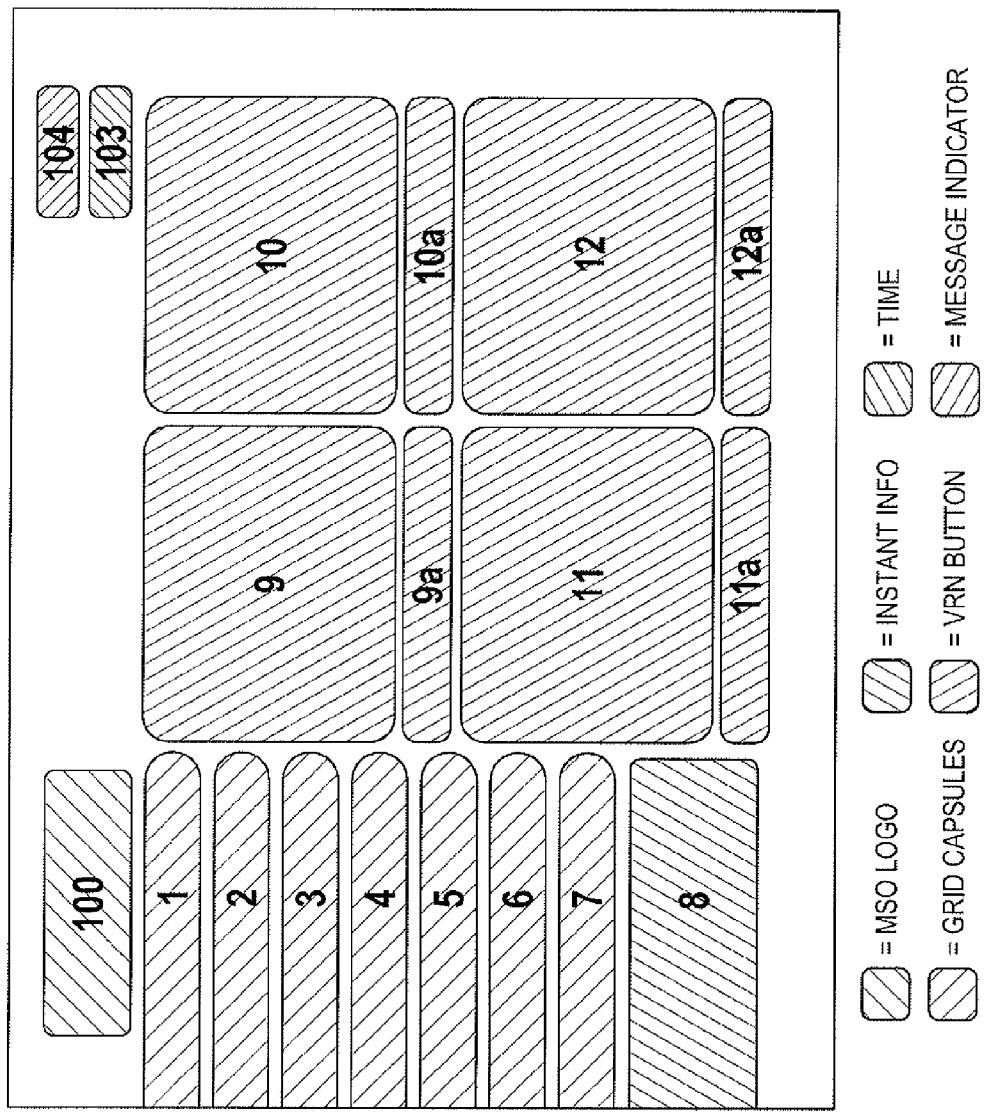

The illustrative templates for each screen/wire frame group of FIGS. 4-17 are briefly described below using a series of tables. These tables include for each of the illustrative templates a wire frame reference table that identifies the various VRN elements of the VRN screen defined by that particular template. Also presented for the template depicted in FIGS. 4 and 5 is a general description table that describes the look and feel of a VRN screen defined by that template. An input key processing table lists the functionality of the remote control keys for default navigation as defined by a template wherein only those functions that are in addition to or different from the functions of the key assignment for the homepage described earlier are discussed. A full list of the functions for the illustrated exemplary templates and associated wire frames as well as additional tables, such as a highlight/customization table that describes default highlight and customization information for a VRN screen as defined in a template, and a screen formatting table that describes how a screen may be formatted as defined by a template, are described in detail in provisional application Ser. No. 60/667,200, filed Mar. 30, 2005, the contents of which is incorporated herein by reference in its entirety.

III.A Template 01—Illustrative Home Page Template (FIGS. 4-5)

TABLE 3

VRN Template 01 Wireframe Reference Table

| Field number | Description |
| --- | --- |
| 100 | MSO Logo |
| 103 | Time Display |
| 104 | Message Indicator |
| 1 to 7 | Menu Buttons 1-7 |
| 8 | Instant Information |
| 9 | Main Video Window |
| 10 | Main Video Window Info Text Bar |
| 11 | Thumbnail video 1 |
| 11a | Thumbnail video 1 Window info Text Bar |
| 12 | Thumbnail video 2 |
| 12a | Thumbnail video 2 Window info Text Bar |
| 13 | Thumbnail video 3 |
| 13a | Thumbnail video 3 Window info Text Bar |

The exemplary VRN Template 01 of FIGS. 4 and 5 includes a set of selectable menu buttons (identified as field numbers "1" to "7" in the wire frame), which may be contiguous. i.e., which are separated only by a minimal blank space. One main VRN button identified as field number "9" serves as the Main Video Window. The area defined by field number "10" can display any button label text configured for the Main Video Window. If a menu button or the Main Video Window Text field is highlighted, instant information configured for the menu button may be displayed in the area defined by field number "8".

Three VRN buttons identified as field numbers "11", "12", and "13" serve as thumbnail videos, with associated button label text displayed in the respective label areas defined by as text field numbers "11a", "12a", and "13a". If a thumbnail video is highlighted, instant information configured for the thumbnail video is displayed in the area defined by field number "8".

Other elements included in the VRN Template 01 of FIGS. 4 and 5 are a non-selectable MSO logo element 100, a non-selectable time element "103", and a non-selectable Message Indicator element "104".

The Main Video Window has an associated audio PID, which is the default audio PID for VRN Template 01. Each of the presentations in the thumbnail videos may have an associated audio PID.

Table 4 shows certain enhanced features of the Input Key Processing when VRN Template 01 is displayed. These various Input Key Processing features are active in addition to most of the features described above in Table 2 with reference to the Home Page.

TABLE 4

VRN Template 01 Input Key Processing Enhanced Features

| No. | Key | Screen Focus | Behavior |
| --- | --- | --- | --- |
| 16.0 | Right Arrow | Any menu button 1-6 | The Guide shall highlight the Main Video Window text bar (10). |
| 16.1 | Right Arrow | Menu button 7 | The Guide shall highlight the first thumbnail video window info text bar (11a) |
| 16.2 | Right Arrow | Main Video Window Text Bar (10) | The Guide shall highlight the last menu button highlighted. |
| 16.3 | Right Arrow | Any thumbnail video window text bar (11a & 12a) except far right | The Guide shall highlight the next thumbnail video to the right. |
| 16.4 | Right Arrow | Far right thumbnail video window info text bar (13a) | The Guide shall highlight the far left thumbnail video window info text bar (11a). |
| 17.0 | Left Arrow | Any menu button 1-6 | The Guide shall highlight the Main Video Window Text Bar (10). |
| 17.1 | Left Arrow | Menu Button 7 | The Guide shall highlight the far right thumbnail video window text bar (13a). |
| 17.2 | Left Arrow | Main Video Window Text Bar (10) | The Guide shall highlight the last menu button highlighted. |
| 17.3 | Left Arrow | Any thumbnail video (12a & 13a) except far left | The Guide shall highlight the next thumbnail video window info text bar to the left. |
| 17.4 | Left Arrow | Far left thumbnail video window info text bar (11a). | The Guide shall highlight the far right thumbnail video window info text bar (13a). |
| 18.0 | Up Arrow | Any menu button except top | The Guide shall highlight the next higher menu button. |
| 18.1 | Up Arrow | Top menu button | The Guide shall highlight the bottom menu button. |
| 18.2 | Up Arrow | Main Video Window Text Bar (10) | The Guide shall highlight the last thumbnail video selected or the far left thumbnail video window info text bar (11a). |
| 18.3 | Up Arrow | Any thumbnail video | The Guide shall highlight the Main Video Window Text Bar (10). |
| 19.0 | Down Arrow | Any menu button except bottom | The Guide shall highlight the next lower menu button. |
| 19.1 | Down Arrow | Bottom menu button | The Guide shall highlight the top menu button. |
| 19.2 | Down Arrow | Main Video Window Text Bar (10) | The Guide shall highlight the last thumbnail video highlighted, or the leftmost thumbnail video window info text bar (11a). |
| 19.3 | Down Arrow | Any thumbnail video | The Guide shall highlight the Main Video Window Text Bar (10). |

The functions of the other keys for the VRN Template 01 of FIGS. 4 and 5, as well as Highlight/Customization and Screen Formatting, are discussed in more detail in the provisional application Ser. No. 60/667,200.

As seen from Table 4, functionality has been added to at least the arrow keys on the remote control, with the operation performed by the keys depending on the particular video window or text bar of the screen focus. The added functionality is specific for a template and can be dynamically assigned, for example, by the screen data or control data, which will be described in detail below.

III.B Template 02—Illustrative News, Sports and Kids Screen Template (FIGS. 6-9)

TABLE 5

VRN Template 02 Wireframe Reference Table

| Field number | Description |
|---|---|
| 100 | MSO Logo |
| 103 | Time Display |
| 104 | Message Indicator |
| 1 to 7 | Menu Buttons 1-7 |
| 8 | Instant Information |
| 9 | Thumbnail video window 1 |
| 9a | Thumbnail 1 video window info Text Bar |
| 10 | Thumbnail video window 2 |
| 10a | Thumbnail 2 video window info Text Bar |
| 11 | Thumbnail video window 3 |
| 11a | Thumbnail 3 video window info Text Bar |
| 12 | Thumbnail video window 4 |
| 12a | Thumbnail 4 video window info Text Bar |

The exemplary VRN Template 02 of FIGS. 6 to 9 includes a set of selectable menu buttons (identified as field numbers "1" to "7" in the wire frame of FIG. 9), which may be contiguous. i.e., which are separated by a minimal blank space. If a menu button is highlighted, instant information configured for the menu button will be displayed in the area defined by field number "8". Up to four VRN buttons "9", "10", "11", and "12" can serve as thumbnail videos. If a thumbnail video window text bar is highlighted, instant information configured for the thumbnail video may be displayed in the area defined by field number "8".

Other elements included in the VRN Template 02 of FIGS. 6 to 9 are an MSO logo element 100, a non-selectable time element "103", and a non-selectable Message Indicator element "104".

All four thumbnail video windows have an associated audio PID, wherein the audio PID associated with the upper left most video window "9" is the default audio PID for VRN Template 02.

Table 6 shows certain enhanced features of the Input Key Processing when VRN Template 02 is displayed. Note that some of these enhanced features are different from those for Template 01 to emphasize that the assignment of the input keys is template-specific.

TABLE 6

VRN Template 02 Input Key Processing Enhanced Features

| No. | Key | Screen Focus | Behavior |
|---|---|---|---|
| 16.0 | Right Arrow | Any menu button 1-5 | The Guide shall highlight the upper left most thumbnail video window text bar (9a). |
| 16.1 | Right Arrow | Menu button 6 & 7 | The Guide shall highlight the lower left most thumbnail video window text bar (11a) |
| 16.2 | Right Arrow | Thumbnail video window text bars (9a & 11a) | The Guide shall highlight the next thumbnail video window text bar to the right. |
| 16.3 | Right Arrow | Far right thumbnail video windows text bars (10a & 12a) | The Guide shall highlight the last selected Menu Button. |
| 17.0 | Left Arrow | Any menu button 1-5 | The Guide shall highlight the upper right most thumbnail video window text bar (10a). |
| 17.1 | Left Arrow | Menu button 6 & 7 | The Guide shall highlight the lower left most thumbnail video window text bar (12a) |
| 17.2 | Left Arrow | Thumbnail video window text bars (10a & 12a) | The Guide shall highlight the next thumbnail video text bar to the left. |
| 17.3 | Left Arrow | Far left thumbnail video window text bars (9a & 11a) | The Guide shall highlight the last selected Menu Button. |
| 18.0 | Up Arrow | Any menu button except top | The Guide shall highlight the next higher menu button. |
| 18.1 | Up Arrow | Top menu button | The Guide shall highlight the bottom menu button. |
| 18.2 | Up Arrow | Thumbnail video window text bars 9a & 10a | The Guide shall highlight the Thumbnail Video Window Text Bars on the bottom row in the corresponding columns (11a & 12a). |
| 18.3 | Up Arrow | Thumbnail video window text bars 11a & 12a | The Guide shall highlight the Thumbnail Video Window Text Bars on the top row in the corresponding columns (9a & 10a). |
| 19.0 | Down Arrow | Any menu button except bottom | The Guide shall highlight the next lower menu button. |
| 19.1 | Down Arrow | Bottom menu button | The Guide shall highlight the top menu button. |
| 19.2 | Down Arrow | Thumbnail video window text bars 11a & 12a | The Guide shall highlight the Thumbnail Video Window Text Bars on the top row in the corresponding columns (9a & 10a). |
| 19.3 | Down Arrow | Thumbnail video window text bars 9a & 10a | The Guide shall highlight the Thumbnail Video Window Text Bars on the bottom row in the corresponding columns (11a & 12a). |

For a discussion of the other keys for the VRN Template 02 of FIGS. 6 to 9, as well as Highlight/Customization and Screen Formatting, reference is again made to the provisional application Ser. No. 60/667,200.

Additional exemplary Templates 03 through 06 and corresponding wire frames are illustrated in FIGS. 10 through 17. Tables 7 to 10 describe the various screen elements on the VRN pages. For a discussion of the other keys for the VRN Templates 03 through 06 of FIGS. 10 to 17, as well as Highlight/Customization and Screen Formatting, reference is again made to the provisional application Ser. No. 60/667,200.

Figure 10:
Figure 11:
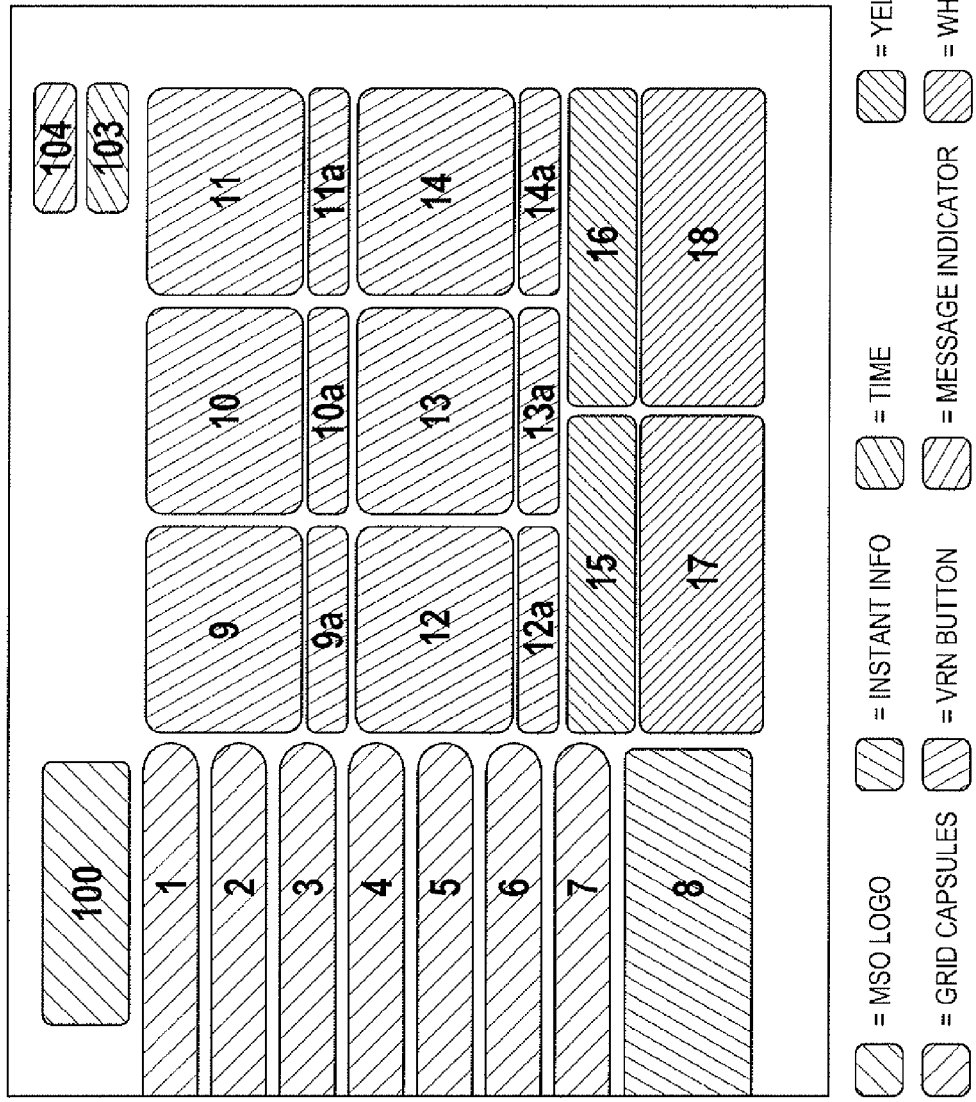

III.C Template 03—Illustrative News, Sports, Kids Screen Template (FIGS. 10-11)

TABLE 7

VRN Template 03 Wireframe Reference Table

| Field number | Description |
|---|---|
| 100 | MSO Logo |
| 103 | Time Display |
| 104 | Message Indicator |
| 1 to 7 | Menu Buttons 1-7 |
| 8 | Instant Information |
| 9 | Thumbnail video window 1 |
| 9a | Thumbnail 1 video window info Text Bar |
| 10 | Thumbnail video window 2 |
| 10a | Thumbnail 2 video window info Text Bar |
| 11 | Thumbnail video window 3 |
| 11a | Thumbnail 3 video window info Text Bar |
| 12 | Thumbnail video window 4 |
| 12a | Thumbnail 4 video window info Text Bar |
| 13 | Thumbnail video window 5 |
| 13a | Thumbnail 5 video window info Text Bar |
| 14 | Thumbnail video window 6 |
| 14a | Thumbnail 6 video window info Text Bar |
| 15 | Sports Score Title 1 |
| 17 | Sports Score Field 1 |
| 16 | Sports Score Title 2 |
| 18 | Sports Score Field 2 |

Figure 12:
Figure 13:
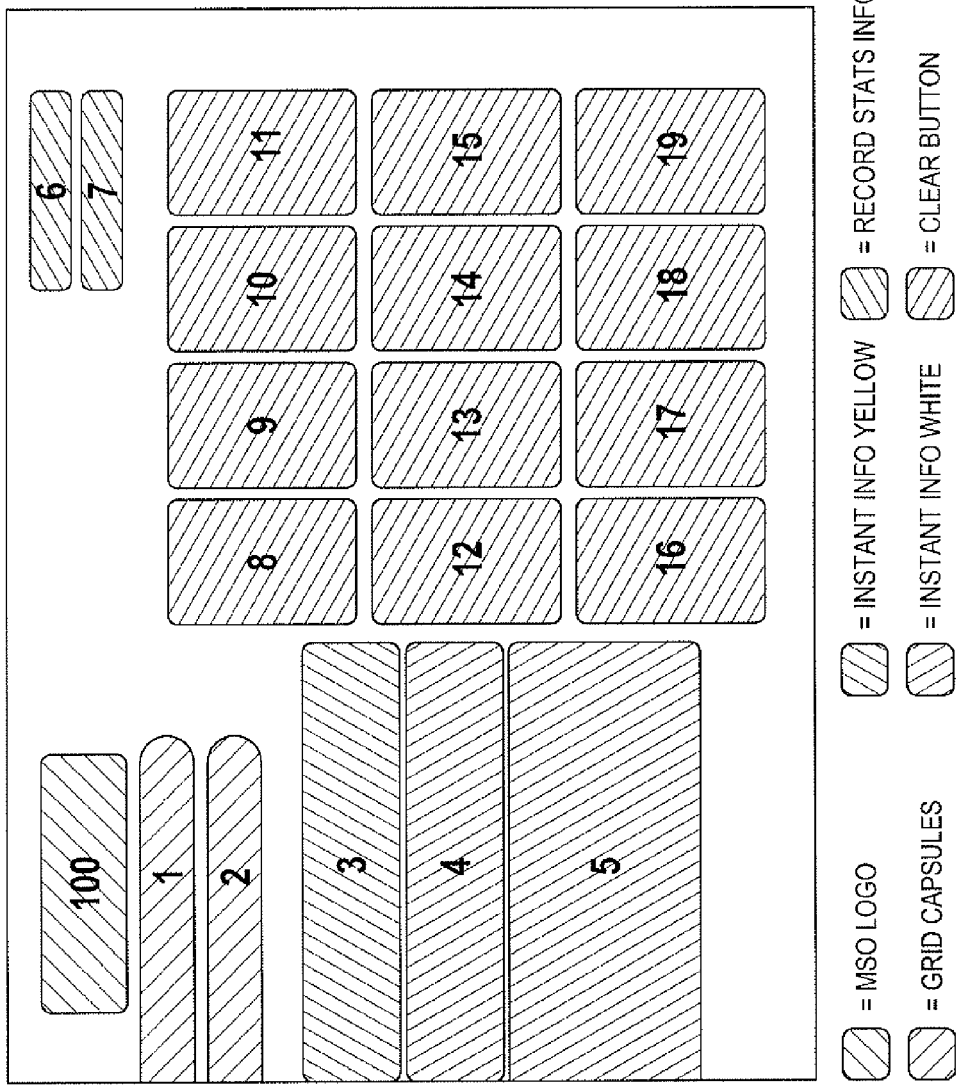

III.D Template 04—Illustrative VOD Template (FIGS. 12-13)

TABLE 8

VRN Template 04 Wireframe Reference Table

| Field number | Description |
|---|---|
| 100 | MSO Logo. |
| 1 to 2 | Menu Buttons 1-2 |
| 3 | Instant Information Title |
| 4 | Instant Information Text Field 1 |
| 5 | Instant Information Text Field 2 |
| 6 | Text info field 1 |
| 7 | Text info field 2 |
| 8-19 | Jacket Art VRN Buttons 8-19 |

Figure 14:
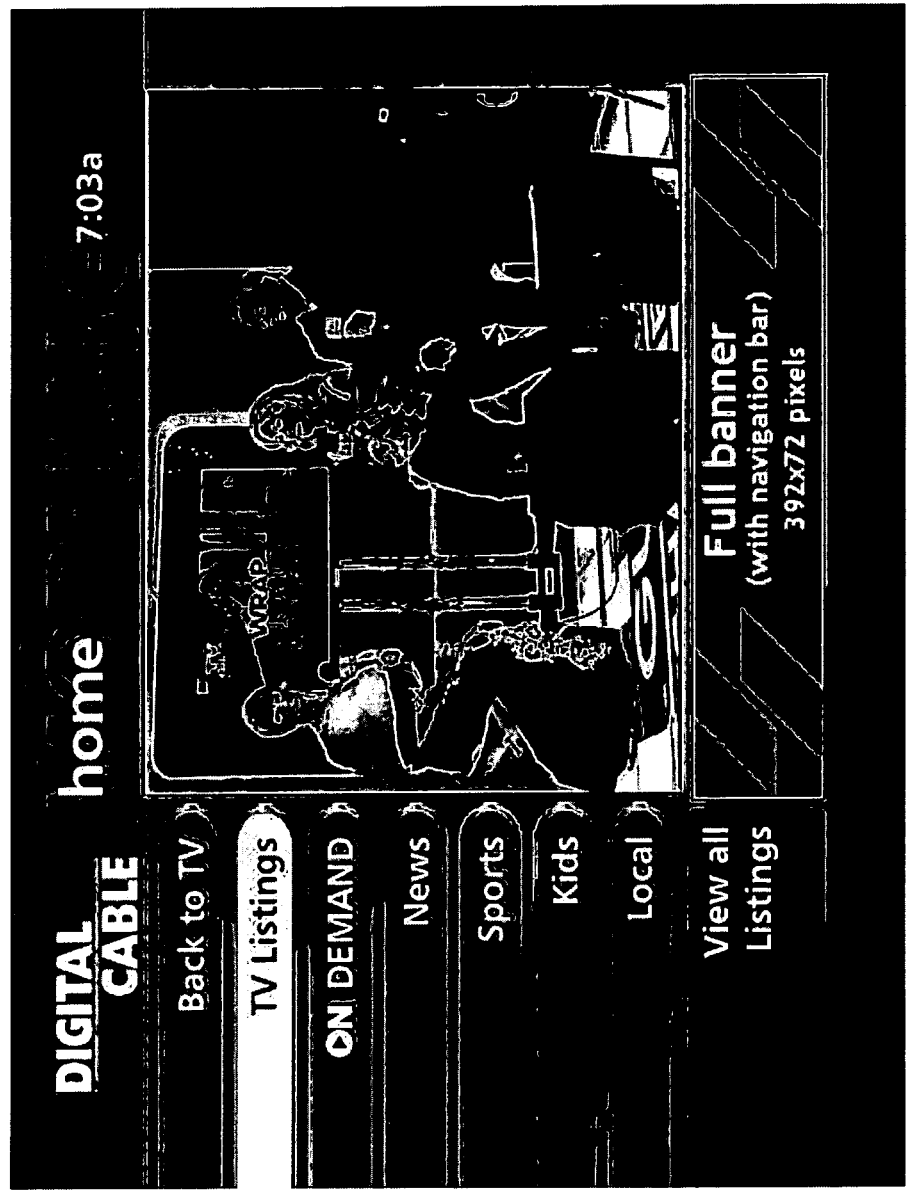
Figure 15:
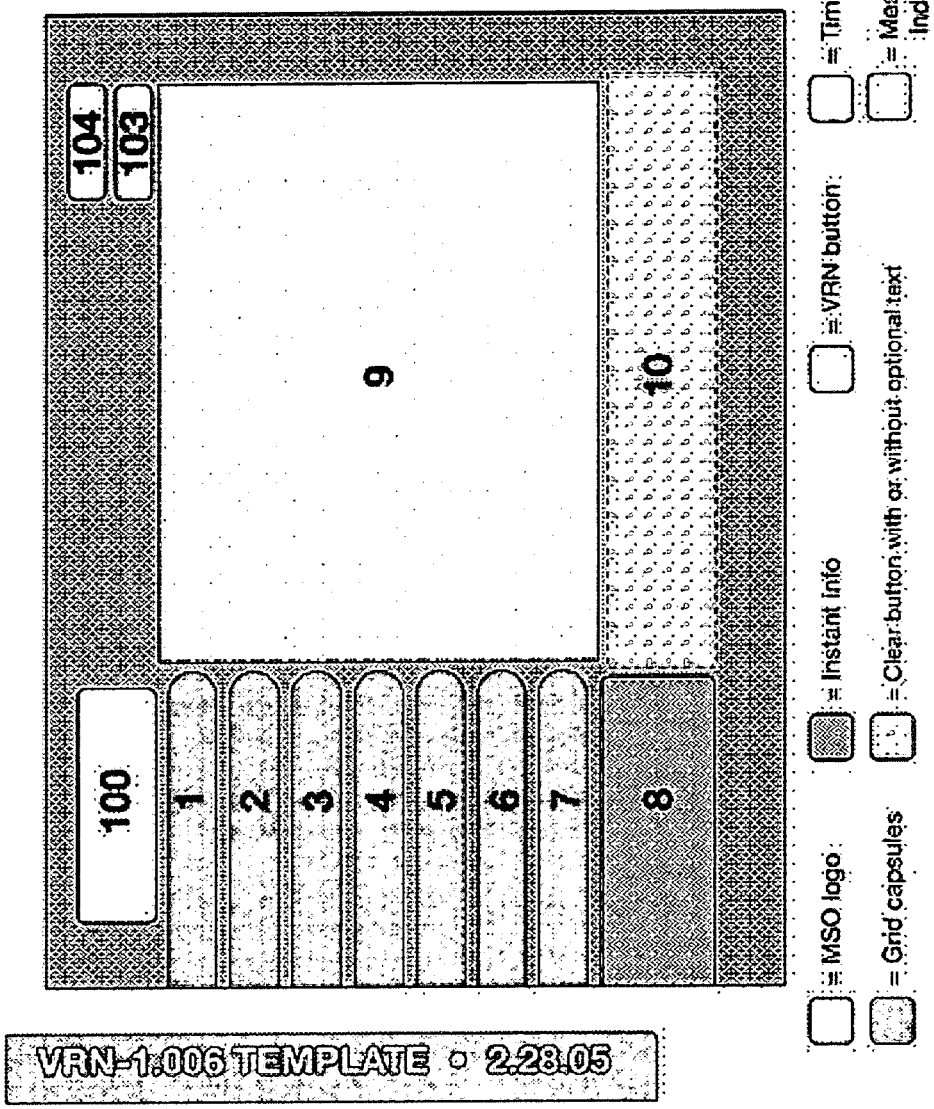

III.E Template 05—Illustrative Main Menu Screen with Advertising Banner Template (FIGS. 14-15)

TABLE 9

VRN Template 05 Wireframe Reference Table

| Field number | Description |
|---|---|
| 100 | MSO Logo |
| 103 | Time Display |
| 104 | Message Indicator |
| 1 to 7 | Menu Buttons 1-7 |
| 8 | Instant Information |
| 9 | Main Video Window |
| 10 | Advertising Banner |

Figure 16:
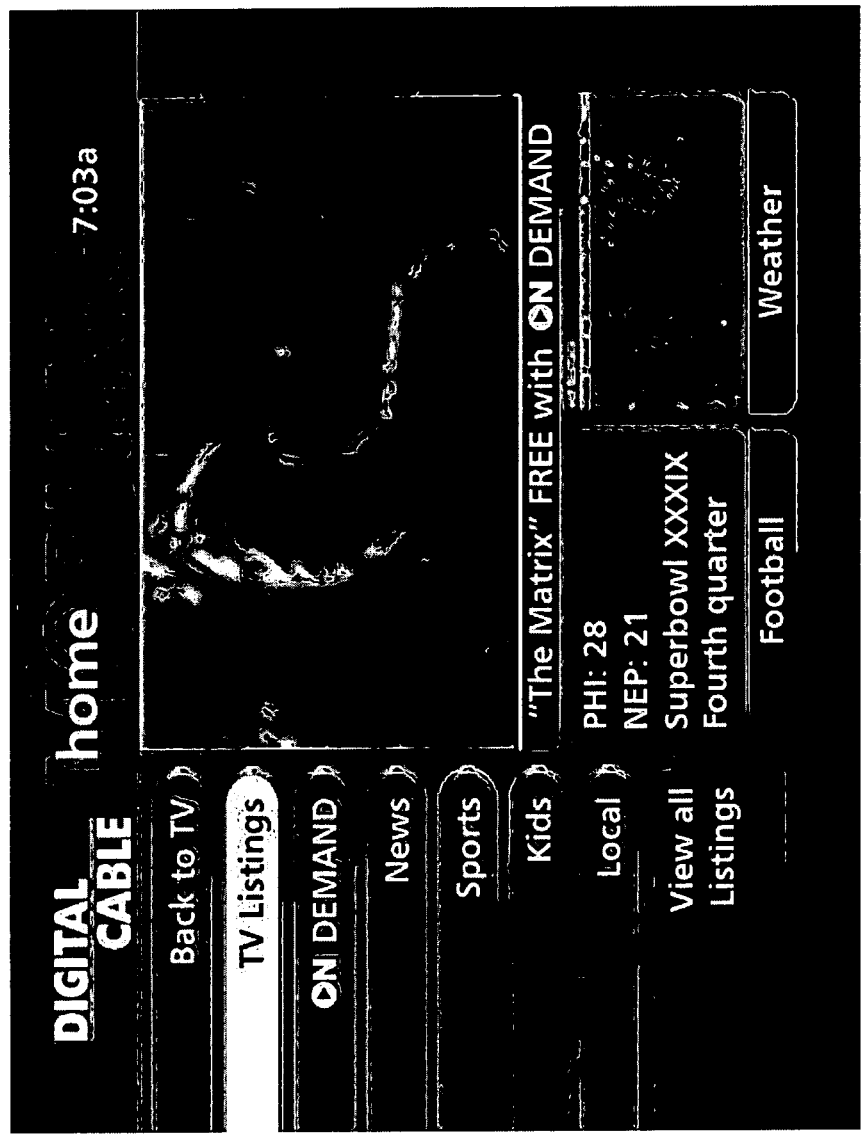
Figure 17:
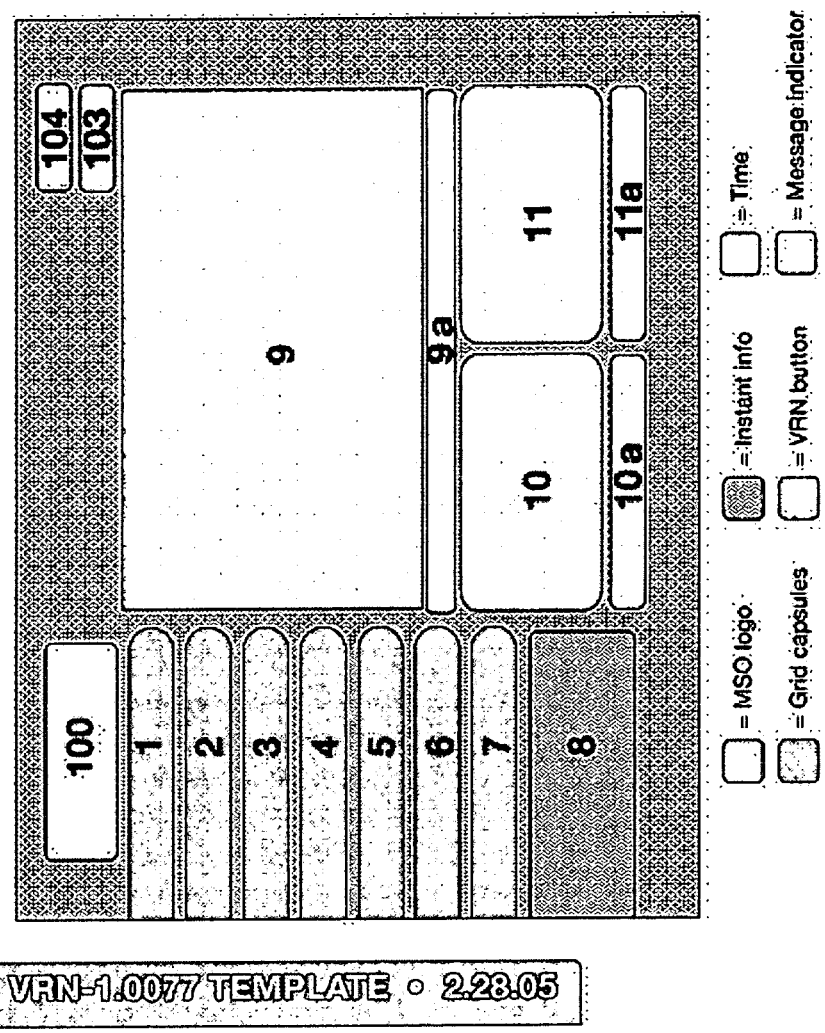

III.F Template 06—Illustrative Main Menu Screen with Instant Information Template (FIGS. 16-17)

TABLE 10

VRN Template 06 Wireframe Reference Table

| Field number | Description |
|---|---|
| 100 | MSO Logo |
| 103 | Time Display |
| 104 | Message Indicator |
| 1 to 7 | Menu Buttons 1-7 |
| 8 | Instant Information |
| 9 | Main Video Window |
| 9a | Main Video Window Info Text Bar |
| 10 | Display Window 1 |
| 11 | Display Window Info Text Bar 1 |
| 12 | Display Window 2 |
| 13 | Display Window Info Text Bar 2 |

As mentioned above, the VRN screens may or may not be defined by a template. However, as the VRN screens depicted in FIGS. 2 through 17 demonstrate, arranging the elements on VRN screens with templates represents an elegant way of displaying the video assets and data and to enhance navigation between different assets while reducing the amount of data required to define each VRN page.

Templates represented, for example, by the aforedescribed wire frames can be transmitted from the network operator, service provider, headend or from any other suitable source, such as the internet, to the user equipment, such as the settop box, and stored locally. A template can be defined by a unique template ID. Templates typically define the arrangement of the various cells and windows on the VRN screen, but by themselves may not include the actual content.

When the VRN client launches a VRN application, it acquires a VRN data stream in addition to the video stream and displays the VRN Channel or program in accordance with the definitions provided in the VRN data stream. The data streams may be transmitted separately out-of-band, or in-band with a VRN channel. Digital in-band data may be carried on a PID separate from the video and audio PIDs. If carried out-of-band, this data may be stored locally by the user equipment 30 (see FIG. 1). If carried in-band, it may be retrieved as needed, but may be cycled at a rate sufficient to display the VRN screen in a reasonable time when the VRN channel is tuned. For example, new data may be cycled at least once per second, and as fast as twice per second. This rate may, in some embodiments, be sufficient for response to channel acquisition, recovery from menu display, recovery from trick mode, recovery from transport problems, and other issues. In some embodiments, VRN data is cycled at least once every thirty seconds for full-time VRN channels, and at least once every fifteen seconds for part-time VRN channels, to avoid timeouts. In some embodiments, the VRN screen data is carried in the Motorola DC-II text format.

While the VRN application is active and in focus (whether or not the application has been disabled due to absence or invalidity of data), the VRN client may continuously monitor the VRN screen data. When the VRN client detects a change to the VRN screen data while the VRN application is active and in focus, the VRN client will immediately update the VRN display. If after a change in the VRN screen data the currently highlighted object is still present and enabled for selection, it will remain highlighted. If after a change in the VRN screen data the currently highlighted object is not present or not enabled for selection or if a template has changed, the VRN client may revert to the default highlight specified in the new definition.

Definitional documents for the VRN application, such as the templates, can be defined in XML format using a schema language, for example, RELAX NG (www.relaxng.org). This schema language does not change the information set of an XML document, supports XML namespaces, treats attributes uniformly with elements, and has unrestricted support for unordered or mixed content.

IV. Control Data and Chunks

In some embodiments, the definition of a VRN application, including the templates for displaying the content described above, the source(s) providing the content, functionality of the key on the remote control described above, and other features of a VRN application, may be supplied in the data streams as control data. In some embodiments, control data may be divided into small sections, hereinafter referred to as "VRN chunks". A VRN chunk can be in form of a single DC-II Text message and advantageously is, in some embodiments, no more than 1000 bytes in length and contains an even number of bytes. The definition of each VRN screen and each individual resource referenced by a VRN screen may be defined in a single VRN chunk, in more than one chunk, or portions of the definition may be included across several chunks. Transmission of control data with a suitable syntax to the user equipment allow comprehensive management of displayed content and user functionality from a headend or central location and conserves transmission bandwidth.

The features and operation of a VRN chunk are best described with reference to FIG. 18 which shows the structure of an exemplary VRN chunk. Further details of the various fields of two exemplary VRN chunks are described in Appendix A and C, respectively, of the provisional patent application Ser. No. 60/667,200.

Figure 18:
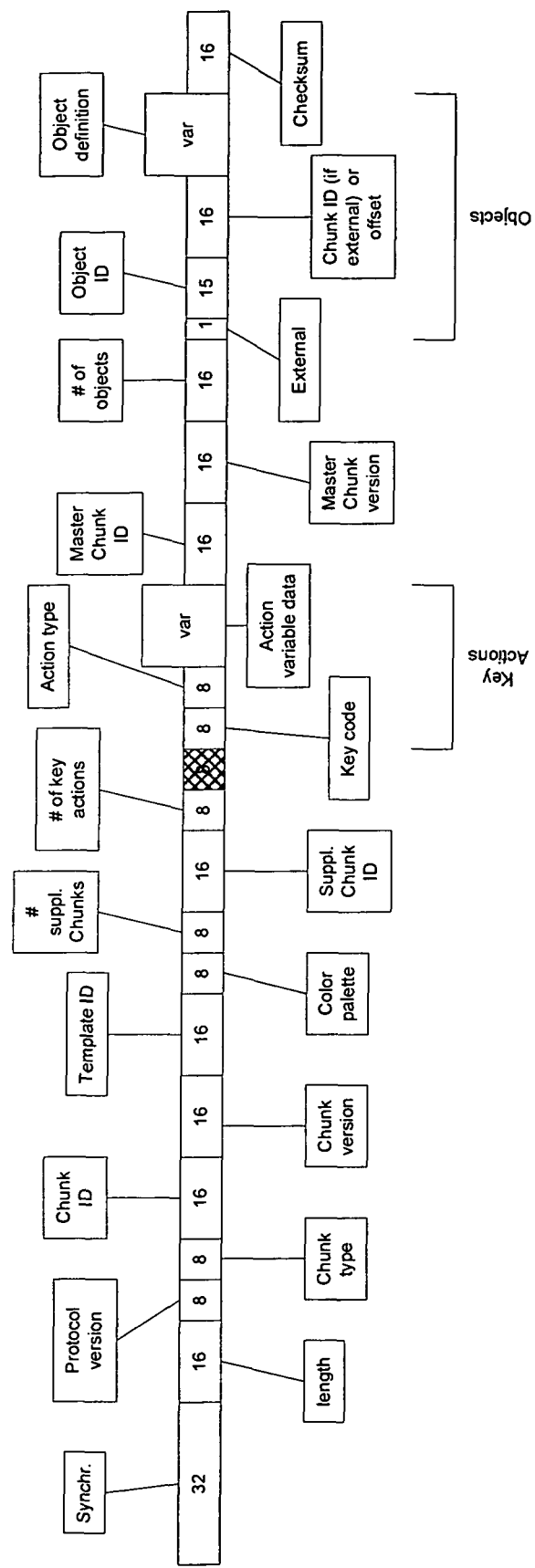
FIG. 18 shows a first embodiment of control data for defining features and interactive elements for a VRN application.

The chunk in FIG. 18 includes a number of fixed-length binary fields and a number of variable-length binary fields. The length of the sum of all binary fields preferably does not exceed 1000 bytes, but may conceptually have an arbitrary length. The length is not fixed and is specified in the second field. The first 32 bits are synchronization bits aiding in the parsing of control data consisting of multiple chunks. Following the protocol version, there are three fields specifying the VRN chunk type (master/supplemental), a chunk ID that is unique within a VRN channel, and the chunk version, so that the user equipment always executes the most recent version. One chunk within the control data for a particular VRN channel will be labeled with a master chunk type, and all others will be labeled as supplemental chunks.

For the master chunk, the next several fields define overall characteristics of the VRN page. This includes the identifier for the template definition file, the associated color palette to use for the page, and the number of supplemental chunks in addition to the master chunk. The definition of the VRN channel is not considered to be complete until the master chunk and all the required supplemental chunks have been received and stored.

The next set of fields define the actions for specific remote control keys for the particular VRN page that override the default set of key actions. This includes a count of the number of key action overrides. For each key to be overridden, the master chunk includes the key code, the type of action to be taken when the key is pressed, and any specific details required for the specified action, as described above in the tables for the template keys assignments. A key that is not defined in the key code will be ignored or take some other default action while the VRN page is active.

The next two fields are present only for supplemental chunks and define the master chunk ID on the particular VRN channel or VRN VOD program as well as the master chunk version. The next field defines the number of objects (i.e., screen elements). This is the number of objects defined in all chunks for a master chunk, and the number of objects in the particular chunk for each supplemental chunk. Following the number of object is the object directory, the list of object IDs and locations. Each object on the VRN page is assigned a unique object ID. For supplemental chunks, only objects defined internally to the chunk are included in the object directory. For master chunks, all objects defined in all supplemental chunks (external objects) are included along with the internal objects. For each object in the object directory, the location is included. The object location is indicated as a chunk ID if the object is external, or as an offset if the object is internal. The offset represents the number of bytes from the start of the chunk to the start of the object definition. The object definitions follow the object directory.

An object in the context of the exemplary chunk structure indicates, for example, a selectable video window, a menu button, selectable or non-selectable text, or fixed items such as logos and time indicators. Each object may include definition of audio properties, language, as well as certain enabled key actions on the remote control. Objects can also include software filters which provide the ability to customize data based on language, terminal characteristics, DVR and VOD functionality, third party applications, and the like. More details can be found in the U.S. provisional application 60/667,200, in particular Appendix B (which describes a slightly different embodiment of a VRN chunk), Appendix C and Appendix E, which describes various software filters. The VRN chunk is terminated with a checksum field.

For example, there may be one VRN chunk for each VRN channel definition, plus one or more VRN chunks for global resources (e.g., strings and graphics, as well as screen elements). Each chunk may have a directory of global resources. It should be noted that VRN chunks may be easily replaced and updated without forcing a change to the application definition itself.

As an example, an VRN application with three interactive channels might include the following chunks:

Three VRN chunks, one defining each of the three interactive channels. These might be sent from a central location.

One VRN chunk, sent from the central location, to define the global resources of the VRN application.

A replacement for the global resources chunk at each headend in which the application is to use different strings, graphics, etc.

A time-dependent VRN chunk containing resources that change over a short period of time, such as strings describing a video clip that is being played on an interactive channel.

Each chunk, defined by a Chunk Number field for example, may define a unique set of objects and attributes of the currently-tuned VRN channel. These are described in more detail with reference to FIGS. 18A and 18B. A change to the content of a chunk (i.e., the change in the definition of one or more of the objects defined in the chunk) will cause a new version of the chunk to be trafficked, with an updated Chunk Version field. The VRN client may ignore any received chunk in which the Chunk Number and Chunk Version match those of a chunk that has already been successfully received and stored. The VRN client may replace the currently stored version of any chunk that is received when the Chunk Number of a received block matches that of a stored block, but the Chunk Version fields are different. When the channel is changed on the settop box (or a VOD program ends), stored VRN data may not be retained.

In some embodiments, the maximum number of chunks per VRN channel may be four. However, there may be more or less than four chunks. One may be considered to be the "master" chunk. All others are "supplemental" chunks. In some embodiments, the supplemental chunks will include data for objects that change frequently, while the master chunk will include data that does not change as often. Another usage model may be to carry global information in the master chunk and localized information in a supplemental chunk. One or more supplemental chunks may be replaced at the headend or central location to add/remove content and/or features without making changes to other supplemental chunks or the master chunks, except for updating the number of chunks.

If there are multiple chunks, the chunk versions of each may be managed independently. For any specific version of a master chunk, there may be many versions of the corresponding supplemental chunks. Only one version of any chunk may be trafficked and effective at any given time. Receipt of a new version of a master chunk will cause the VRN client to discard and reacquire any stored supplemental chunks. Receipt of a new version of a supplemental chunk will not cause the IPG to reacquire the master chunk, unless the newly acquired chunk indicates that it is not compatible with the old master chunk ID and version.

Figure 19:
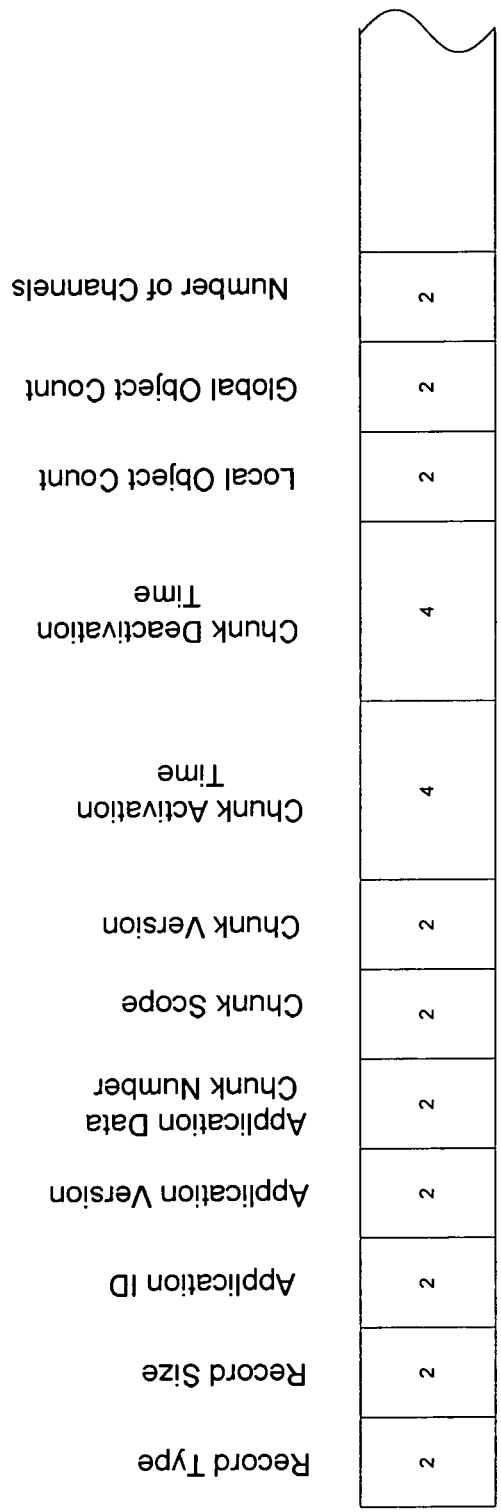
FIG. 19 shows a second embodiment of control data for defining features and interactive elements for a VRN application.

Referring now to FIG. 19, a slightly different VRN chunk definition illustrates how a VRN application is defined from data combined across multiple data streams or multiple records from a single data stream. Only the first twelve fields are shown, as many of the features defined by the other fields are similar to those described with reference to the VRN chunk of FIG. 18.

In this example, when determining which chunks to accept and store from the VRN screen feed, the VRN client application may examine the following fields:

Application ID. All VRN chunks associated with a given VRN application will have the same ID, and this is not expected to change as the application is revised.

Application Version. All VRN chunks associated with an application will have the same application version number. A change in this field will cause the client to discard all stored chunks with earlier version numbers. This may change when, for example, a change in the design/layout of the application occurs. Changes in resources such as strings and graphics change will be marked in the Chunk Version field. The VRN client will look for any changes to the version number, not just incrementing.

VRN Chunk Number. Each chunk of an application is given a unique number. When a chunk is updated the new chunk should retain the same chunk number. When a global version of a chunk is replaced with a more local version, the same chunk number should be used. Chunk numbers do not have to be consecutive, and the VRN client is only expected to store enough chunks to correctly display the portion of the VRN application associated with the currently tuned data stream. The VRN client should store at most one chunk having the same combination of application ID and chunk number.

Chunk Scope. This field specifies how "global" the contents of the chunk are. A higher number implies a more local scope. For example, this field might contain a "0" if the chunk is the global version, a "4" if the chunk is intended for an entire MSO, an "8" if the chunk has been localized for a particular cable system, and a "10" if the chunk has been localized for a particular headend. It is preferred that the scope is set by the distribution equipment, so that the VRN client does not receive multiple versions of the same chunk with the same scope.

Chunk Version. This number should be changed whenever a change is made to any of the data within the chunk. When the client detects a changed chunk version, it should discard the previous version and replace it with the new one. Note that a chunk can be revised without causing any other chunks in the VRN application to be modified or recollected.

Chunk Activation Time and Deactivation Time. Multiple variations of the same chunk with the same chunk number, scope and version may be available as long as they do not have overlapping activation and deactivation time. In some embodiments, the distribution equipment does not traffic any chunks that are not currently active.

The VRN client uses different types of resources to render the user interface for a VRN application. Objects for such resources may be instantiated by the VRN application, and the accessibility of such objects may be defined within chunks. For example, resource objects may include:

Strings (which may include multi-lingual translations)

Graphics, such as GIFs and MDEs (which may also be available in multi-lingual versions).

Software Filters (a software filter string which is to be passed to and evaluated by the VRN client, such as an IPG.) A software filter is an expression that includes one or more conditions which can be checked by the local VRN client, and which evaluates to true or false. The software filter is used to allow portions of the VRN definition to be conditional based on local conditions.

VRN Client Action, such as Guide Action (maps to the program guide's custom menu button)

Database Lookup (returns data from an interactive television application database such as a guide database).

User Input (allows collection of numeric strings, passwords, and multi-choice selections)

Resource objects may be either local or global. Local resources may be only accessible within the chunk in which they are defined. Global resources may be accessed from any chunk in the VRN application.

Each resource object has an Object ID. Local resource objects may have Object IDs less than 32768. Within each chunk, the local Object IDs will start at 1 and be assigned sequentially. Global Object IDs may be in the range, for example, 32768-65535. They must be unique across all chunks in the application, and do not need to be sequential.

In some embodiments, chunks may contain two object directories. The first is a directory of all local objects defined/used in the chunk. The second is a directory of all global objects defined in the chunk. Each directory entry defines the offset within the chunk at which to find the detailed definition of the object.

When a VRN screen makes a reference to a local object, the client will only look in the same chunk in which the page itself is defined. When a VRN screen makes a reference to a global object, a search through all current chunks for the VRN application must be performed. This search must give preference to the more local chunks. For example, if an VRN screen in chunk 1 refers to object number 0x8002, and there is a definition for object 0x8002 in both chunk 1 and chunk 4, the chunk scope of each must be checked. If the chunk scope of chunk 4 is higher (more local), its definition of the object will be given preference.

Figure 18A:
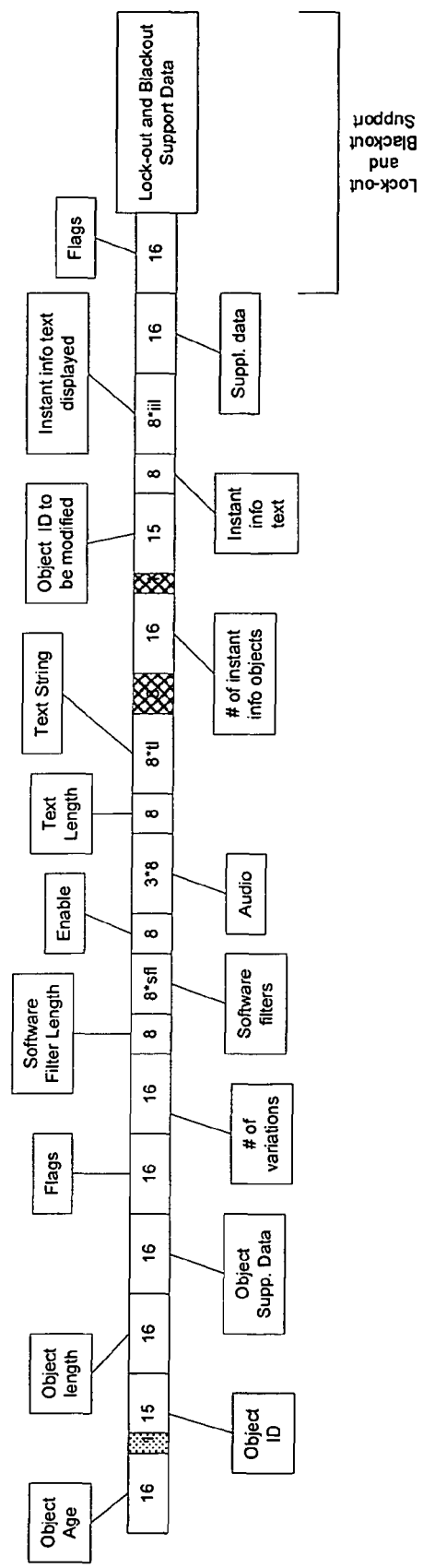
FIG. 18A shows a first segment of the control data defining the objects in the control data for a VRN application.

As indicated in FIG. 18, each chunk contains multiple object definitions. Referring now to FIG. 18A, the object definitions include a number of fixed-length binary fields and a number of variable-length binary fields. The first 16 bits define the object age, which corresponds to the number of previous versions of this chunk in which this same definition of this object has been present. In general, assuming chunk versions are incremented with each change, this value is calculated as the current chunk_version minus the chunk_version in which this object definition was last modified, in twos complement arithmetic. The maximum value is 32767. This field is followed, except for a pad bit, by the object ID matching the entry in an object directory and by the object length defining the size of the object. The value in the following field is used to skip over, without parsing, any supplemental data for this object that is not supported by the version of the VRN client.

The "flags" field is used to prompt the VRN client to check at a predetermined interval for changes to the object, such as parental control. The next field provides the number of variations defined for the present object. All subsequent fields are repeated for each defined variation. The conditions under which each variation is to be used are defined by its software filter. If no software filter is specified, a null software filter is used. Software filters allow customization of data based on language, terminal characteristics, DVR and VOD functionality, third party applications, and the like.

The following field referred to as "enable" enables display and selection functionality. For example, a value 0x01 enables the display of the object variation and 0x02 enables the selection of the object variation, whereas a value of 0x00 causes an object variation (such as a menu option) not to be displayed or selectable. Other values can, for example, mask a video window and to allow its selection. In the next field, the audio PID can be selected when this variation of the object is highlighted. If this field is 0x000000, the audio will be disabled while this object is highlighted. If this field is 0xffffff, the default audio PID will be selected when this object is selected.

The next six active fields define values for display options and modalities relating to text. The text length and the text to be displayed as part of the object variation are specified, as well as the number of objects with instant info text to be displayed. The instant info text is associated with the object ID of each object to be modified. Instant info text is text that is displayed as part of another object on the VRN page when this object is highlighted by the user.

The value in the next field is used to skip over, without parsing, any supplemental data for this object variation that is not supported by the version of the VRN client.

Figure 18B:
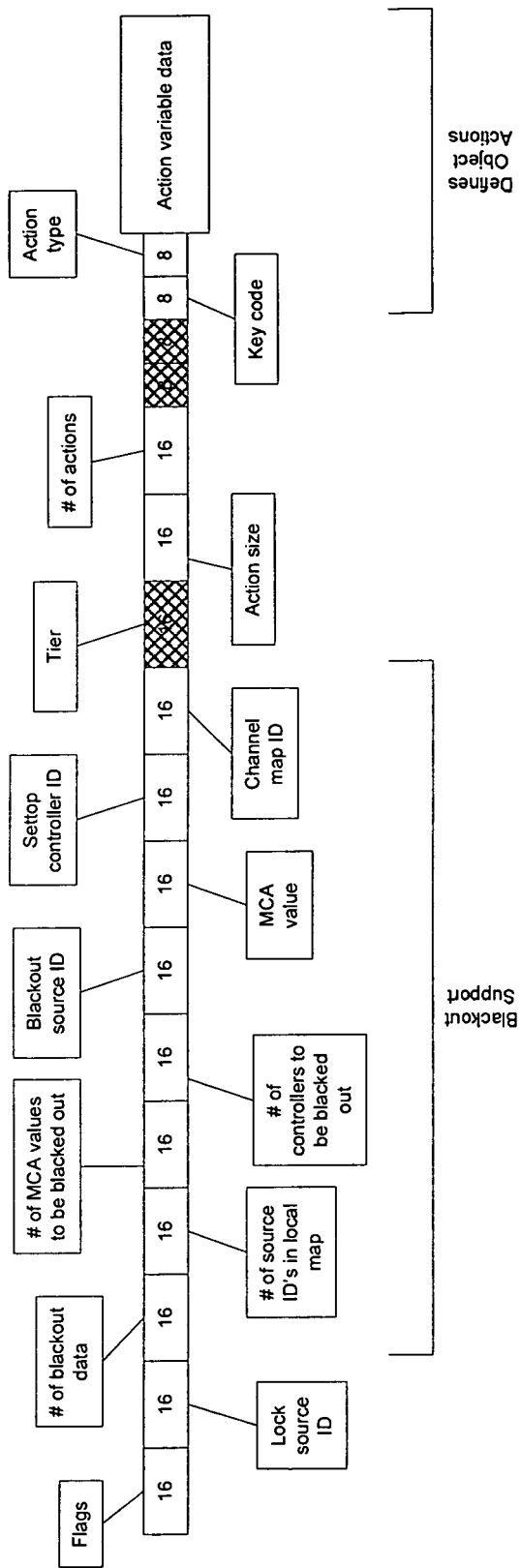
FIG. 18B shows a second segment of the control data for controlling program availability and key actions in a VRN application.

The following field "flags" is used to set parental controls ("1"), black out ("2"), and tier ("4") of programs and is followed by the Lock-Out/Blackout Definitions, which are shown in detail in FIG. 18B.

Referring now to FIG. 18B, each object definition contains data that allow programs in individual windows within the VRN channel to be locked out by the user or blacked out by the service provider. If an individual window showing an individual video asset is locked or blacked out, the VRN client will draw an overlay over the top of the window, preventing the user from viewing the video.

If parental controls are active (set to "1"), the field "lock source ID" locks the object variation based on the provided Source ID. The object variation will be locked if and only if a parental control PIN has been set, if locks have not been bypassed, if the Source ID is in the local channel map, and if either the Source ID is locked or the program currently scheduled to air on the service is locked by title or rating. In some embodiments, the lock criteria may be specified by the object variation's software filter, rather than by Source ID. In that case, the VRN client may reevaluate the filter regularly, for example, at least once per minute, while the page is displayed to ensure that the parental control criteria are up-to-date.

If blackout controls are active (set to "2"), the first four fields relating to blackout data define the number of bytes of blackout data for this variation; number of source IDs that, if present in the local map, will cause this object variation to be blacked out; specify the number of MCA (Multi-Cast Address) values that are to be blacked out; and specify the number of controllers that are to be fully or partially blacked out. In some embodiments, the VRN client may dynamically check the blackout criteria regularly once the page has been displayed. The next three fields relating to blackout data specify the blackout source IDs, MCA values, and settop controller ID to which the blackout applies. For each Source ID, if the specified channel is in the channel lineup, the object variation will be blacked out. For each MCA (multicast address, e.g., geographical region), the object variation may be blacked out if the user equipment is part of the defined group. For each controller ID, the object variation may be blacked out if the user equipment is controlled by the specified controller. For each controller ID, there may also be a field that holds a count of channel maps and a field with a list of channel map IDs, in which case the blackout will be applied if the user equipment is controlled by the specified controller and has one of the specified channel maps. In some embodiments, the blackout criteria may be specified by the object variation's software filter, rather than by Source ID, MCA, controller ID and channel map ID.

The field "tier" refers to potentially required authorizations, but will not be described further. If tier checking is active, the tier value specifies which tier to check for. The tier value is value that uniquely identifies an authorization that may or may not be provided by the controller. If the tier is authorized, the object variation may be enabled, which if the tier is not authorized the object variation may be blocked or disabled. In some embodiments, the tier may be specified by the object variation's software filter, rather than by tier value.

The following two fields specify the number of bytes used to define all key actions and the number of key actions defined for this variation. For each key action, fields define the key code, the action type, and additional variable data for the action.

The key code in the following field conforms to the standard Motorola key code, with the only allowed values being 17 (OK), 22 (Lock), 51 (Info), 52 (Cursor Up), 53 (Cursor Down), (54 (Cursor Left), and 55 (Cursor Right). The action type defines the functionality to be performed when the specified key is pressed on the remote control while the object variation is highlighted. The button functions are defined by the action variable data, which will now be briefly described.

The action variable data define the details of the actions taken by the client in response to user selection of the object variation with the specified key, and the format of the action variable data depends on the specified action type. The field "Action Type" in FIG. 18B can have the following values:

0=Home (IPG Main Menu)
1=Page Up
2=Page Down
3=Exit
4=Browse
5=Message Center
6=Favorites
7=Local View (weather)
8=Setup
9=Timers (Manual Recordings)
10=VOD Menu or Submenu
11=Listings
12=Menu
13=Third Party Application
14=Lock Setup (PIN configuration)
15=Lock Selection (Channels, Ratings, Programs, etc. to be locked)

16=Goto
17=Subtitles
18=Search Screen
19=Saved Searches
20=Key Press
21=Linear Program Action
22-99 are not defined, and are ignored by the VRN client
100-254 are reserved for IPG defined internal button types
255=Inactive Exemplary defined action variable data fields for illustrative action types are:

For "Listings '11'":
  Listings_type 1=Grid, 2=ChanTime, 3=TimeChan, 4=Chan, 5=Title, 6=A-Z Search, 7=My Recordings, 8=My Schedule (Scheduled Recordings), 9=Series Priority List
  Screen_title Variable length title
  Search_filter Variable length filter string
  Source_ID List of Source IDs. If present, only displaying listings from those sources.
  Other fields specify highlight positions displaying current time and channel and first program in list not yet airing, preview channel, and the like.

For "Goto '16'":
  Goto_type 1=Source Id (tune)
  2=Network Id (tune)
  3=VOD Clip (play)
  4=VOD Program (info)
  5=VRN VOD Clip (play)
  6=Addressable Clip (play)
  7=Addressable VRN VOD Clip (play)
  8=Addressable location within the current VRN VOD Clip
  9=VOD submenu
  10=VOD listing screen
  0, 11-255: Ignored by the VRN client The actions associated with "Listings '11'" further include an action field with a search filter that defines the channel and program event filtering used to select the listing information to be displayed. It specifies specific combination of attributes as described in the following Table 11:

TABLE 11

| Position | Attribute |
| --- | --- |
| 1 | Basic |
| 2 | Premium |
| 3 | a la carte |
| 4 | PPV |
| 5 | NVOD |
| 6 | Video |
| 7 | Data |
| 8 | Audio |
| 9 | Special Purpose |
| 10 | Special Event |
| 11 | Adult |
| 12 | List By Title |
| 13 | Movie |
| 14 | Child |
| 15 | Sports |
| 16 | Favorites |
| 17 | HDTV Service |
| 18 | TV Guide Top Picks |
| 19-25 | Reserved |
|  | For sports programs, the following subcategories are defined: |
| 26 | Football |
| 27 | Sports (Misc.) |
| 28 | Outdoors |
| 29 | Ice Hockey |
| 30 | Soccer |

TABLE 11-continued

| Position | Attribute |
| --- | --- |
| 31 | Documentary |
| 32 | News/Talk |
| 33 | Motor Sports |
| 34 | Basketball |
| 35 | Golf |
| 36 | Baseball |
| 37 | Horse Racing |
| 38 | Pro Wrestling |
| 39 | Variety |
| 40 | History/Biography |
| 41 | Extreme Sports |
| 42 | Boxing |
| 43 | Water Sports |
| 44 | Volleyball |
| 45 | Winter Sports |
| 46 | Tennis |
| 47 | Track & Field & Running |
| 48 | Olympics |
| 49 | Ice Skating |
|  | For non-sports programs, the following subcategories are defined: |
| 26 | Comedy |
| 27 | Drama |
| 28 | Religion |
| 29 | Educational |
| 30 | Home/How-To |
| 31 | Documentary |
| 32 | News/Talk |
| 33 | Food/Travel |
| 34 | Cartoons & Animation |
| 35 | Action & Adventure |
| 36 | Crime Drama |
| 37 | Sci-Fi/Fantasy |
| 38 | Mystery & Suspense |
| 39 | Variety |
| 40 | History/Biography |
| 41 | Music |
| 42 | Health & Fitness |
| 43 | Western |
| 44 | Science & Technology |
| 45 | Business & Finance |
| 46 | Game Show & Contest |
| 47 | Teens |
| 48 | Horror |
| 49 | Martial Arts |

The search filter string specifies which combinations of program and channel attributes should be selected for inclusion on the resulting IPG listing screen. A record will be listed only if it matches one or more combination specifications. Attributes (the meanings of the bits in the Attributes field and the last 32 bits in the Search Filters) are under complete control of the back office, i.e. the VRN client has no knowledge of what the bits mean. I.e., the VRN client only cares if the bits in the Attributes field do or don't match characters in the Search Filter.

In some embodiments, a VRN application may be defined in one or more XML documents. These XML documents may be transmitted to the VRN client, or they may be compiled into chunk data as described above, and the chunk data may be transmitted to the VRN client. In some embodiments, the VRN application may be defined in a software application that generates the chunk data directly, without requiring the generation of an intermediate XML format. A schema for an XML document that defines a VRN application can be defined in RELAX NG, which is a simple schema language for XML and specifies a pattern for the structure and content of an XML document. A RELAX NG schema may itself be an XML document. The details of the Relax NG schema are described at the following web site: http://www.relaxng.org.

A Relax NG schema for a VRN application is described in detail in Appendix H of the US provisional patent application Ser. No. 60/667,200, the entire contents of which are incorporated herein by reference.

The required fields to be supplied as chunk data for the XML document include, inter alia, channel references, attribute activation/deactivation, text string definitions, definitions of graphic objects to be displayed, user input (e.g., password), software filters, definition of menu buttons, and VRN page definitions. Software filters for a VRN application are described in detail in Appendix E of the U.S. provisional patent application Ser. No. 60/667,200, the entire contents of which are incorporated herein by reference.

Returning to FIG. 1, the XML document for the VRN application can be compiled in compiler 20 of VRN screen data source 14 into binary VRN screen data that is ultimately received by user equipment 30 and executed by a VRN client to provide a VRN application.

In one embodiment, the VRN screen data may be interpreted at the client by a chunk grammar file defining the format of a VRN chunk using, for example, a RELAX NG schema described above. The chunk grammar file can also be compiled into a binary file in compiler 20 and sent to the user equipment 30. The chunk grammar file does not contain chunk data, but enables the transmitted chunk data to be properly interpreted. An illustrative chunk grammar file for interpreting the chunk data depicted in FIG. 18 is described, for example, in Appendix N of the provisional application Ser. No. 60/667,200, the entire contents of which are incorporated herein by reference.

Figure 20:
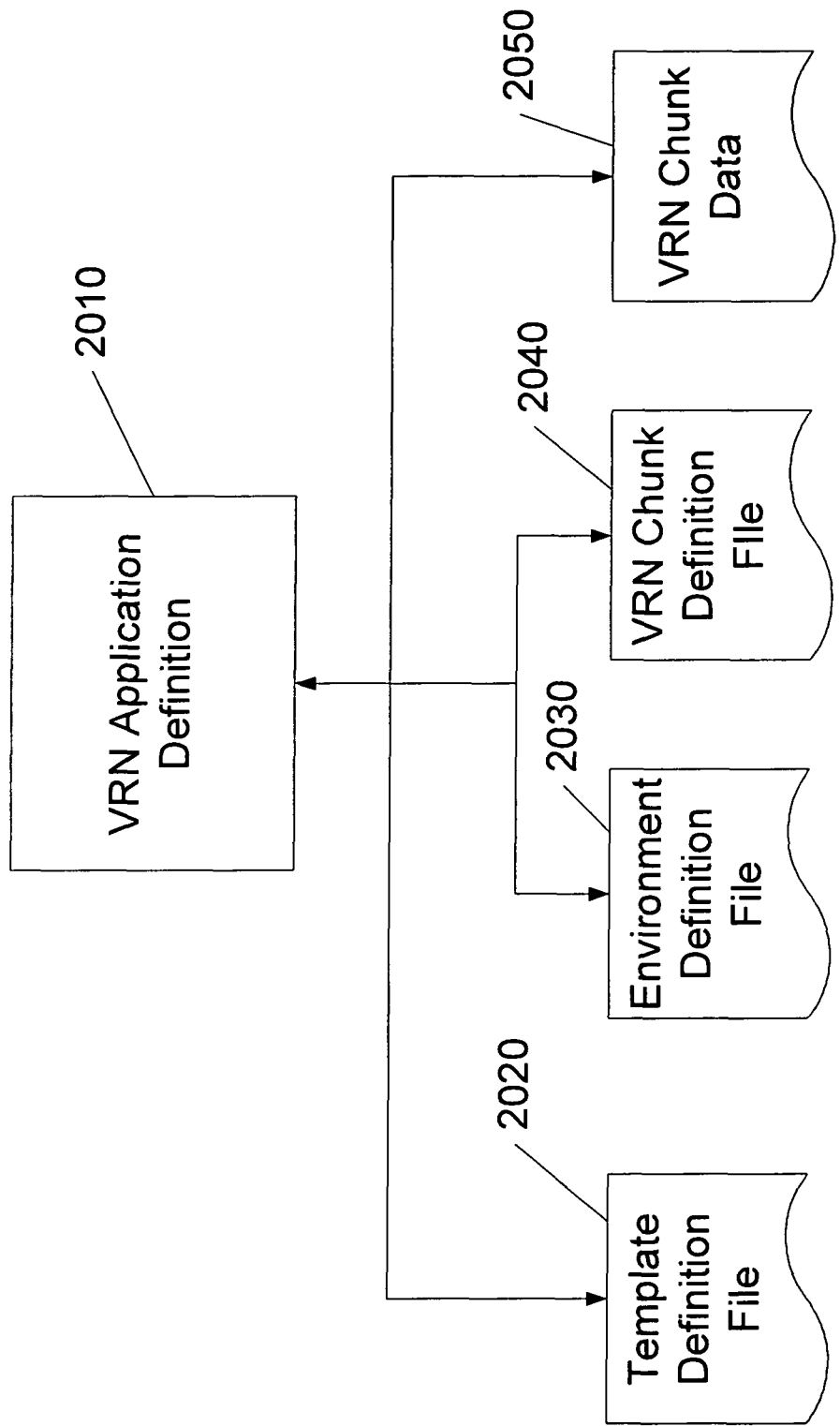
FIG. 20 shows schematically definition files associated with a VRN application.

FIG. 20 shows an illustrative overview of another approach for defining VRN screen data for a VRN application 2010. User interface 18 (FIG. 1) may allow an operator to create and edit four types of files that define a VRN application: template definition files 2020, environment definition files 2030, VRN chunk definition files 2040, and VRN chunk data 2050.

The template definition file 2020 provides the details of the template definitions. In some embodiments, the file naming standard is VRN 1 Template nnn.xml. This template designation was used above in the description of the 7 exemplary templates. If the file specifies a single template, "nnn" is the ID of that template. If the file specifies the set of available templates, the "nnn" is omitted. There are two purposes for this file:

Allow the VRN chunk data to be validated.

Provide information for the user interface to ensure that the correct data is entered for the selected template.

In some embodiments, these files may be manually generated. Appendix J of the provisional application Ser. No. 60/667,200 describes an illustrative grammar used to define the format of this file. Appendix K of the provisional application Ser. No. 60/667,200 provides an example of an illustrative template file.

The environment definition file 2030 provides definitions of specific channels, networks, VOD clips, VOD subcategories, and other assets, that may be referenced by name within the VRN data. This allows the operator of VRN screen data source 14 (FIG. 1) to select these items by name, rather than having to enter a Source ID, Asset ID, or other enigmatic information. The file name format may be, for example, "VRN 1 Environment xxxx.xml". The string "xxxx" is a unique name or identifier for the specific identifier, such as "CMC".

In some embodiments these files may be manually generated. In some embodiments, these files may be entirely or partly generated automatically. For example, the definitions of the names and source ID numbers of available channels may be generated automatically from a system that manages channel lineups for cable systems, and the definitions of the names of available VOD clips and their provider IDs and asset IDs may be generated automatically from a VOD server. Appendix L of the provisional application Ser. No. 60/667, 200 describes the format of this file. Appendix M of the provisional application Ser. No. 60/667,200 provides an example of an illustrative environment definition file.

The VRN Chunk Definition File 2040 provides the exact definition of a specific version of a specific chunk of VRN data in an XML format. User interface 18 (FIG. 1) allows an operator to write and send these files. The file name format may be, for example, "VRN 1 Chunk ttt xxxx sssss m ccccc vvvvv yyyymmddhhmmss yyyymmddhhmmss.xml". The string "ttt" is the template number used for the chunk. The string "xxxx" is the environment identifier. The string "sssss" is the Source ID on which this chunk is to be transmitted. The string "m" is "M" for master chunks and "s" for supplemental chunks. The strings "ccccc" and "vvvvv" are the chunk ID and the chunk version number. The filename also includes the start and stop date/time at which this chunk is to be broadcast. See Appendix N for an illustrative grammar used to define the format of this file. Appendix O of the provisional application Ser. No. 60/667,200 describes an exemplary VRN chunk definition file for a master chunk. Appendix P of the provisional application Ser. No. 60/667,200 provides an illustrative example of a VRN chunk definition file for a supplemental chunk.

VRN chunk data files 2050 may be created by compiler 20 in the published binary format for VRN data. One file is created for each data chunk. The naming format is the same as for the XML chunk definition files, except that the file extension is ".dat". An exemplary chunk data file is illustrated in FIGS. 18, 18a and 18B.

In one exemplary embodiment, the VRN application 2010 depicted in FIG. 20 can be managed from user interface 18 in the central facility 10 (see FIG. 1), or from a user interface in the distribution facility 20 (not shown in FIG. 1). For example, the user interface 18 may be graphic user interface (GUI) capable of providing one or more of the features listed below. These features allow an operator to create and manage VRN screen data in VRN screen data source 14 for a VRN application. The structure Manage the template definition files 2020

Allow a template definition file 2020 to be loaded

Manage the environment definition files 2030

Allow an environment definition file 2030 to be loaded

Manage the VRN chunk definition files 2040 for master and supplemental chunks and allow the VRN chunk definition files to be loaded and updated Create and edit chunk data 2050 for the chunk definition files Output the binary chunk data files 2050 depicted in FIGS. 18 and 19

Manage the relationship between master chunks and supplemental chunks, as described in Section IV Manage the versioning of chunks Automatically calculate fields in the binary chunk data such as message length, text length, text compression, object offsets, pad bytes, and checksums; enforce chunk size limitations Present the data input fields on user interface 18 in organized input forms Include drop-down lists where appropriate to facilitate entry of fields with pre-defined values Support a mode in which non-standard values can be entered for these fields for testing purposes Allow fields and values only as appropriate based on the selected template, the chunk type, and other entered field values Allow the entry of elements with variable numbers of members (e.g., multiple objects per chunk, multiple variations per object, multiple instant info definitions per object)

Figure 21:
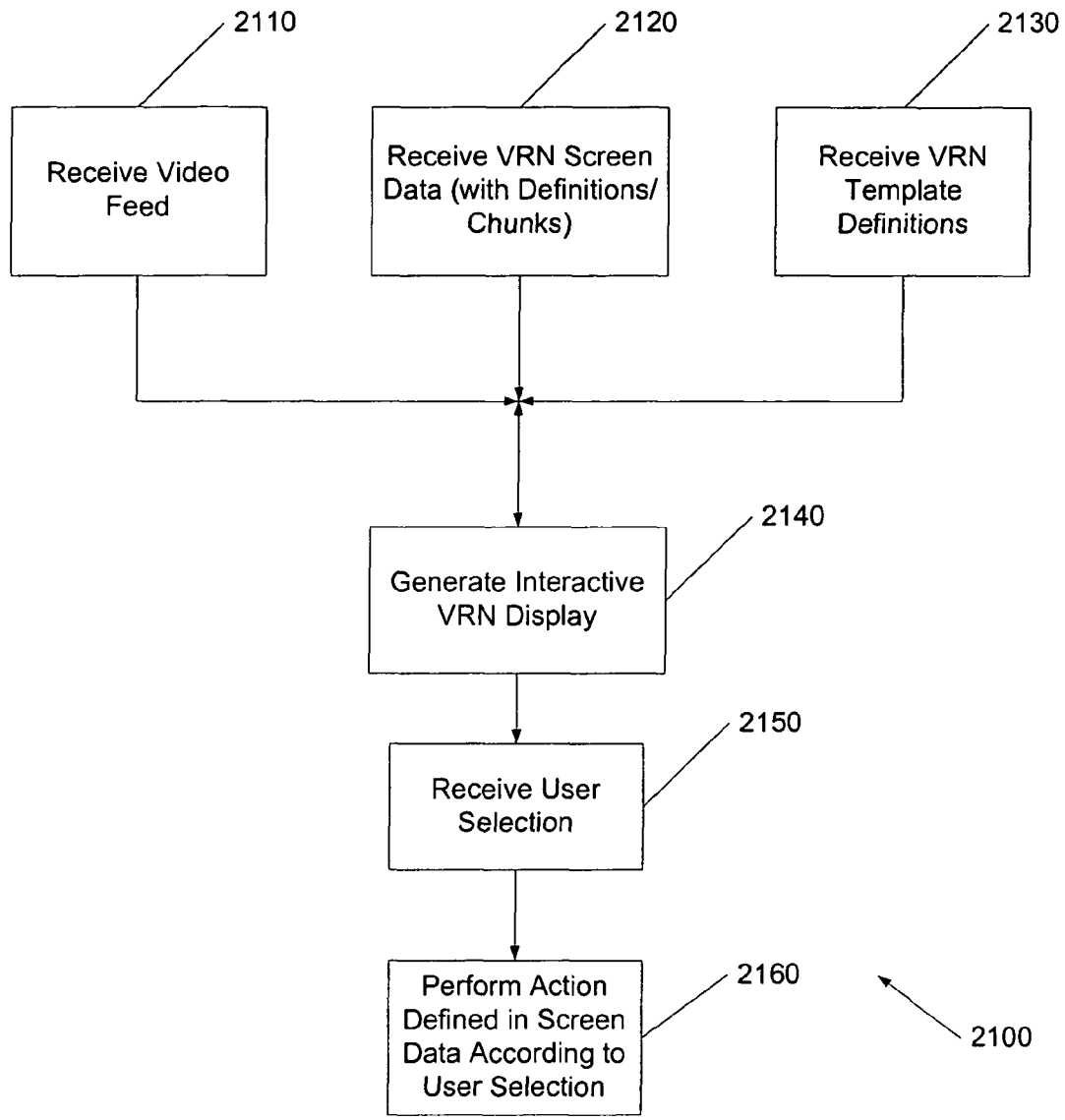
FIG. 21 shows an exemplary process flow for setting up a VNR screen and performing a user-initiated action.

Provide guidance (and limitation) for the entry of software filters and menu actions FIG. 21 shows an exemplary process flow 2100 for generating a VRN screen and performing a user-initiated action on a displayed VRN element on the VRN screen based on VRN screen data transmitted to the user equipment. The VRN screen may be, for example, any of the VRN screens described above with reference to FIGS. 2 to 17. At step 2110, a client receives a video feed with VRN assets, for example, form content source 12 or local content source 22. The video feed can be a composite video stream or a multi-channel video feed, either digital or analog. The video feed may be broadcast or on demand. At step 2120, the client also receives VRN screen data, for example, from VRN screen data source 14, or a screen data source in the distribution facility 20, such as the local insertion equipment 22. Screen data were previously also referred to as control data, and may be formatted in "chunks." Screen data may be received in-band with the video feed, or may be received out-of-band (e.g., in a separate feed). If received out-of-band, the screen data may be received prior to the receipt of the video feed and stored. At step 2130, the client may also receive VRN template definitions. The template definitions may be transmitted from the central facility 10 or distribution facility 20 periodically or occasionally, and may or may not be stored on user equipment 30. The template definitions may be received as part of the VRN client that generates the VRN screen. These steps 2110, 2120 and 2130 define an exemplary VRN application and need not be performed in a particular order. The VRN application may be operational with or without templates, but is greatly simplified by using templates. When the data from steps 2110 and 2120, and optionally 2130, are completely received at the client, a VRN display with interactive VRN screen elements is produced, at step 2140. At step 2150, the user can, for example, highlight a screen element, for example, by using a remote control device, and the VRN client performs (or causes to be performed), at step 2160, the actions selected by the user in accordance with the functions that are enabled by the screen data for the VRN asset which is in focus. The actions may, as discussed above, cause a full motion video to be displayed, highlight another video button, transition to another VRN screen, and the like.

Figure 22:
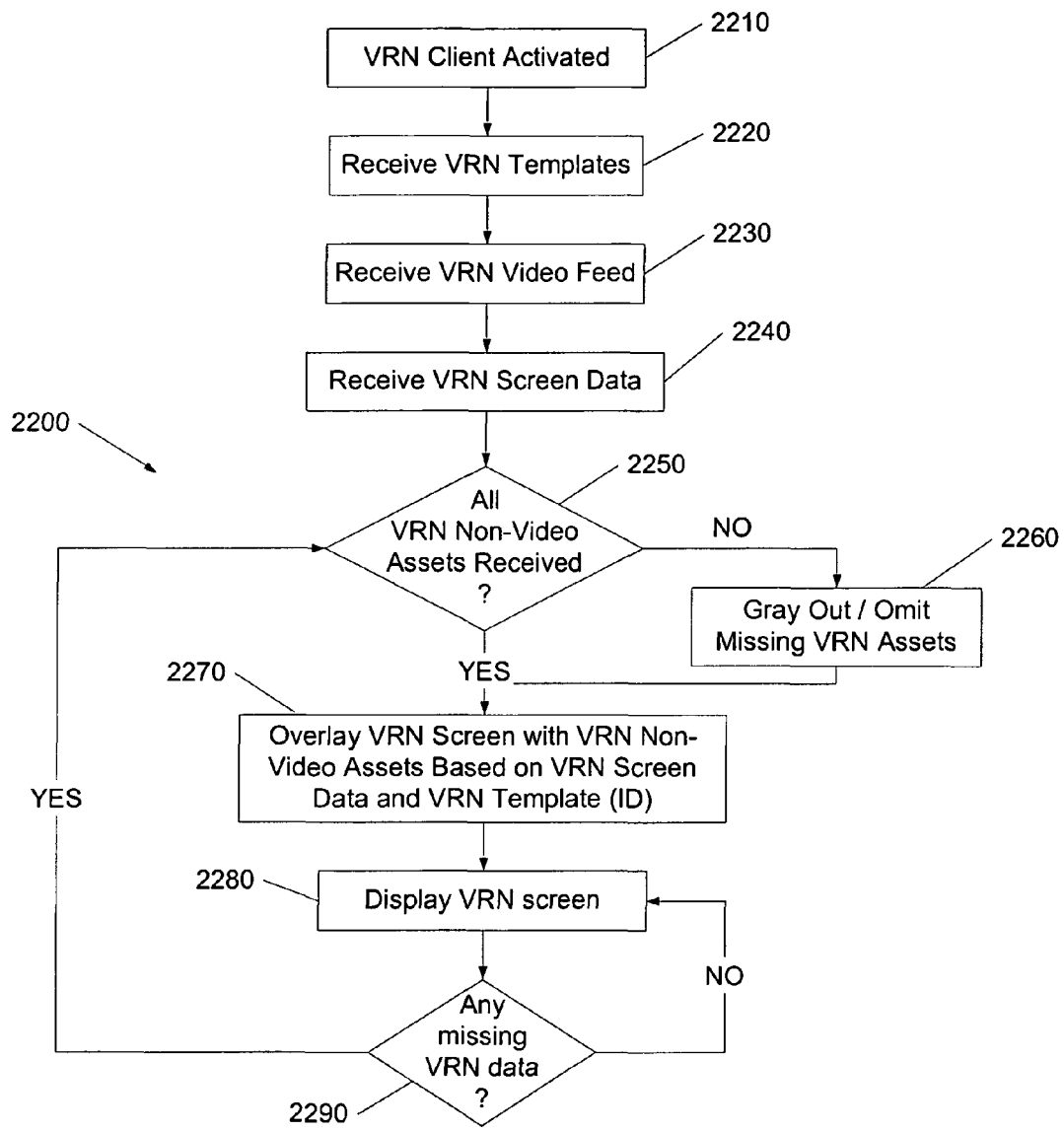
FIG. 22 shows an exemplary process flow for setting up a VRN screen using templates.

FIG. 22 shows an exemplary process flow 2200 for displaying a VRN screen using templates on the VRN video assets. At step 2210, the VRN client such as user equipment 30 is activated and receives, at step 2220, templates, unless the templates were previously stored. The templates can be generated, for example, in central facility 10 via user interface 18. At step 2230, the client receives a video feed and, at step 2240, VRN screen data from, for example, central facility 10 or distribution facility 20, as described above with reference to FIG. 21. The VRN client is activated at step 2210, for example, when the user first turns on the user's equipment, in response to the user's equipment tuning to a channel having associated VRN screen data, in response to the user activating a VRN guide, or at any other suitable time. At step 2250, the VRN client checks if all VRN non-video assets necessary to overlay the VRN video feed have been received. If this is the case, the VRN client overlays the VRN non-video assets on the VRN feed according to the VRN screen data, at step 2270. The VRN template can simply be identified by its template ID. VRN elements or buttons on the VRN screen for which no VRN data were received are either omitted from the VRN screen, or they are shown, but otherwise obscured or disabled, for example, grayed out, step 2260. At step 2280, the VRN screen is displayed, and at step 2290, the VRN client will check periodically if new VRN data are received from either central facility 10 or distribution facility 20. The VRN screen will then be updated based on the additionally received data, for example, by allowing/preventing assets to be displayed, by substituting assets in a VRN video feed, by updating enabled interactive functions, and the like.

Figure 23:
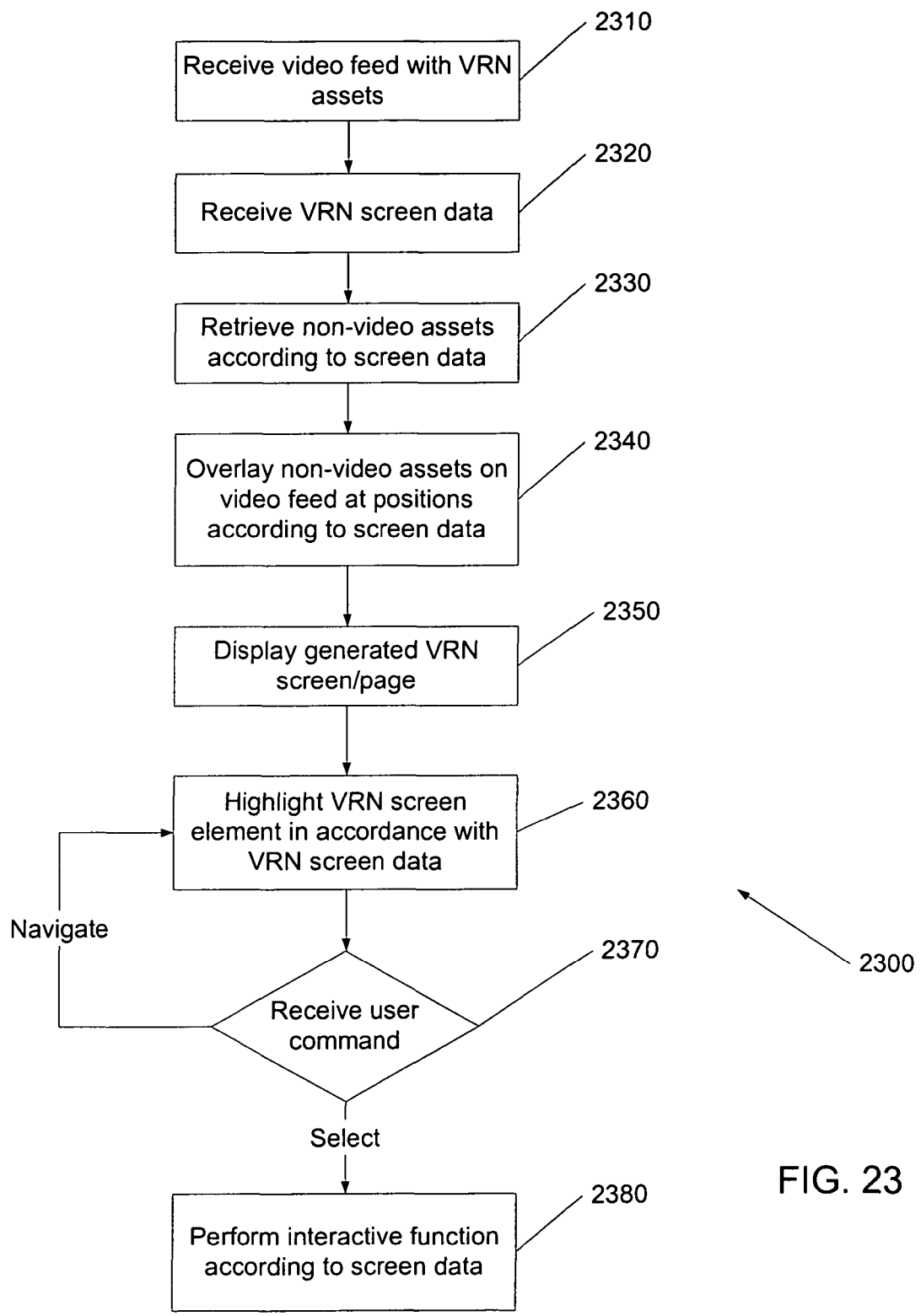
FIG. 23 shows an exemplary process flow for setting up a VRN page with selectable video elements.

FIG. 23 is a flowchart of an illustrative process 2300 for creating a VRN screen having, among other things, selectable video elements. For purposes of illustration, and not by way of limitation, this process is explained with respect to the VRN screen of FIG. 2, although it may be used to provide any of the other VRN screens of FIGS. 4-17, or any other suitable VRN screen with selectable video elements. At step 2310, the user's equipment (e.g., user equipment 30 of FIG. 1) receives a video feed of video assets for inclusion in a video rich (VRN) display. In the example of FIG. 2, each of the video regions of the VRN screen ("Matrix Revolutions," "On Demand," "Sports Net," "CN8" and "Now Playing") is a different asset of the feed, and all of the assets are simultaneously transmitted such that they each take up a different portion of the frames of the video stream that make up the feed. In other words, the video feed may be considered a single video, with each of the assets being arranged in a different portion of that video feed and being associated with a different region on the display.

At step 2320, the VRN client receives VRN screen data. The VRN screen data define the look and feel of the VRN screen that is to be generated by the client. The VRN screen data define, for example, the source of the video feed, and defines the positions of the selectable video elements, the positions of the other elements of the VRN screen (e.g., the menu options), and identifies the actual non-video assets of the VRN screen (e.g., the background of the screen that surrounds the video assets and menu options, and the menu options themselves). In some embodiments, templates (e.g., defining the wireframe of FIG. 3) may be used as described herein to simplify the screen data.

At step 2330, the VRN client retrieves non-video assets (e.g., the menu options and background) from memory (e.g., within the control circuitry 32 of user equipment 30 of FIG. 1) to generate the VRN screen. Some or all of the non-video assets may be received as part of the VRN screen data. At step 2340, the VRN client generates the VRN page by overlaying the non-video assets (e.g., the menu options and background) onto the video feed. These non-video assets mask the portions of the video feed that do not include the video assets used for the VRN buttons. Approaches for overlaying elements onto video are known in the art. It should be noted that not all of the video assets of a feed may be viewable on any given page and/or at any given time. For example, additional assets for inclusion in other VRN screens, such as the VRN screen accessible by the user from a displayed VRN screen, may be included in a feed. In some embodiments, assets from sources not available to the user may be masked by the VRN client. The VRN screen data define which assets are provided on which VRN screens. Unused assets are masked by non-video elements and are not displayed.

The VRN screen data may also define video assets as selectable thereby providing VRN video buttons as described herein. At step 2350, the VRN client displays the generated VRN screen on the user's equipment (e.g., on display device 34 of FIG. 1) and, at step 2360, positions a highlight region on a video asset in accordance with the VRN screen data. The screen data may define the video asset (and the other video assets) by, for example, defining the x/y position of a corner coordinate and the size of a video asset, or the x/y positions of the four corners of the video asset, or using any other suitable approach. In some embodiments, this information is specified in a template. When a video asset (or other object) is highlighted, the VRN client may perform other suitable actions that may be specified by the template or the screen data. For example, the VRN client may select an audio track associated with a highlighted video asset and it may display user help text or other information related to the highlighted asset in another screen location (instant information). At step 2370, the VRN client receives a user command (e.g., from input device 38 of FIG. 1). When the user command is a navigation command, the VRN client moves the highlight region to another on-screen element. For clarity, FIG. 23 shows only positioning the highlight region on another video asset. In practice, the highlight region may also be placed on non-video elements such as the menu options of FIG. 2. When the user command is a selection command, the VRN client will perform the action associated with the selectable element as defined in the VRN screen data, step 2380. Identifying which element has been navigated to and/or selected may be accomplished using any suitable approach. For example, the VRN client may track the user's navigation history and/or current position, wherein the navigation positions are associated with elements in the VRN screen data.

Figure 24:
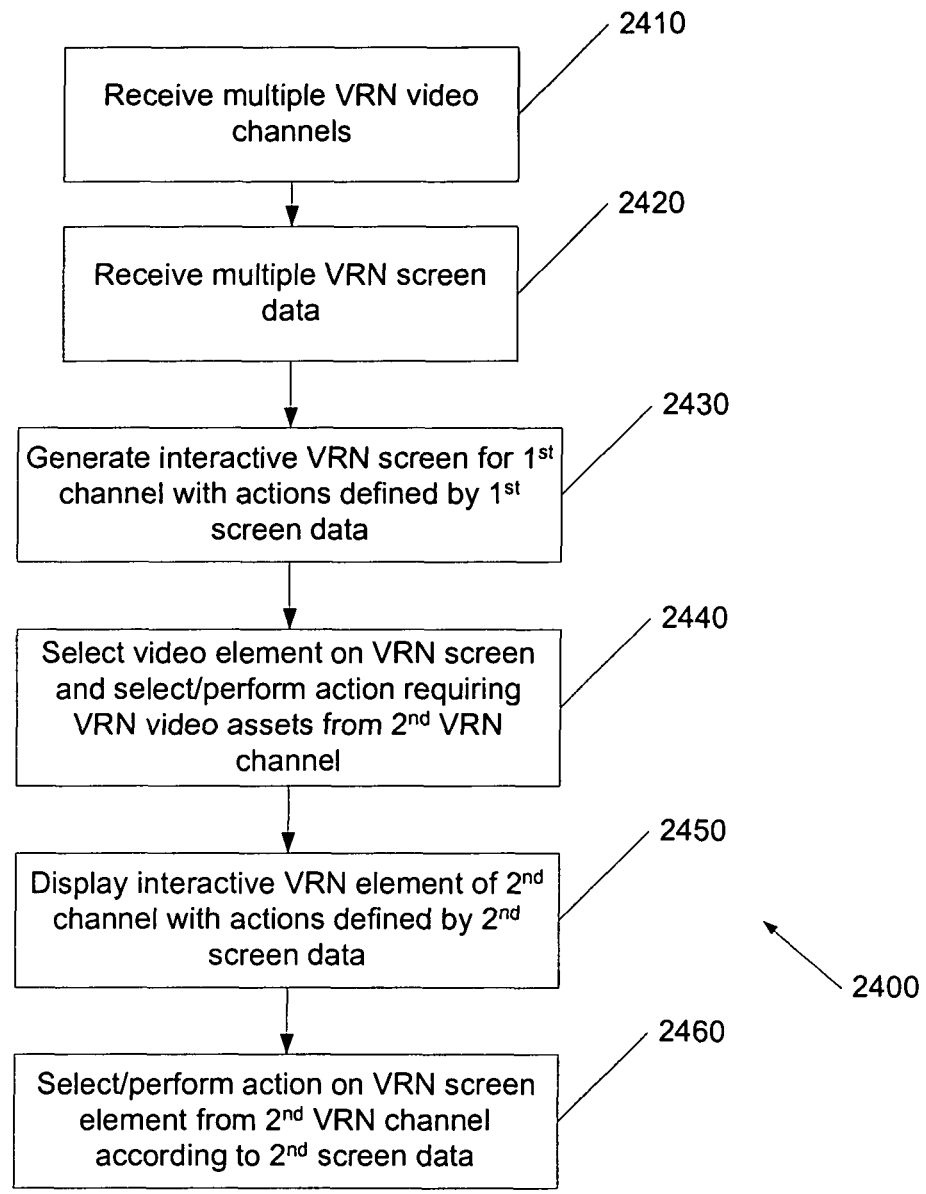
FIG. 24 shows an exemplary process flow for setting up a VRN application from different VRN feeds.

FIG. 24 shows an exemplary process flow 2400 for generating a VRN application from several VRN video and screen data feeds. At step 2410, user equipment 30 receives from a content source, such as content source 12 and/or 24, multiple VRN channels which as described above, can be separate analog/digital channels and/or video channels from a composite video stream. At step 2420, user equipment 30 receives from VRN screen data source 14 or local insertion equipment 22 multiple VRN screen data for the various video channels and generates, at step 2430, for display on display device 34 an interactive video screen with VRN elements from a first channel with interactive functions and features defined by the screen data associated with the first video channel. At step 2440, user may select a VRN video element, such as exemplary VRN button 12 (labeled "ESPN") of FIGS. 4 and 5 that requires or is linked to one or more additional VRN assets from another VRN video channel. This may happen, for example, if the user highlights an interactive VRN video element titled "SPORTS" (not shown) and opens another VRN screen with multiple sports sources, such as the sports channels ESPN, FOX SPORTS, ESPN2, SPEED, NBA, and NFL, as depicted in FIGS. 10 and 11, with not all of the sports channels sharing a common video channel. The organization of VRN video data and VRN screen data with multiple sources may be controlled by application data source, for example, via suitable control data or chunks, as described above.

At step 2450, the VRN elements of the second (and/or additional) channel are displayed (FIG. 10), with interactive functions that are defined by the VRN screen data from the second (and/or additional) VRN screen data, which actions will then be perform in response to user input, at step 2460. In some embodiments, multiple sets of VRN screen data may be associated with a single VRN channel. Each set of screen data may represent a different VRN screen, with a different set of non-video assets and objects that may be displayed as overlays on the same video background.

Thus, an interactive media guidance application with video-rich navigation (VRN) is provided. Video content may be displayed on a VRN screen which may include traditional and interactive video buttons. One skilled in the art will appreciate that the present invention can be practiced by other than the described embodiments, which are presented for purposes of illustration and not of limitation, and the present invention is limited only by the claims which follow.

We claim:
1. A method for providing a video-rich navigation interface, comprising:
receiving, with a client, a plurality of video feeds, wherein each of the plurality of video feeds comprises a respective plurality of full-motion video assets, at least one of the respective plurality of full-motion video assets comprising a video being broadcast on a broadcast channel, wherein the full-motion video assets of the respective plurality of full-motion video assets are simultaneously received;
receiving, with the client, screen data for the plurality of video feeds, wherein the screen data define:
a first full-motion video asset of a first video feed of the plurality of video feeds as selectable by a user, and
an action to be performed in response to a selection from the user of the first full-motion video asset that belongs to a first category, and wherein:
the plurality of video feeds, the screen data, and a plurality of interactive displays for the plurality of video feeds generated based on the screen data collectively form an application, and
the action comprises accessing a second video feed of the plurality of video feeds; and
generating an interactive display for the second feed based on the screen data;
generating, with the client, a first interactive display of the plurality of interactive displays, wherein the first interactive display comprises a display of a menu option that represents a second category and a display of the respective plurality of full-motion video assets of the first video feed comprising the first full-motion video asset that belongs to the first category; and
in response to receiving a selection from the user of the menu option that represents the second category, changing the displayed first full-motion video asset that belongs to the first category to a second full-motion video asset that belongs to the second category while maintaining the display of the menu option in the first interactive display;
receiving, with the client, a selection from the user of the displayed first full-motion video asset; and
in response to the user selection of the displayed first full-motion video asset:
accessing the second video feed and the screen data; and
generating a second interactive display displaying at least one selectable full-motion video asset of the second video feed in a position in the second interactive display determined by the screen data.

2. The method of claim 1, wherein each of the respective plurality of full-motion video assets of the plurality of video feeds is selected from a live broadcast program, a VOD asset, a PPV asset, a DVR asset, a Webcast, a preview, and an advertisement.

3. The method of claim 1, wherein at least one video feed of the plurality of video feeds comprises one or more analog channels, one or more digital channels, or a combination thereof.

4. The method of claim 1, wherein the screen data define a layout of an interactive display for each of the plurality of video feeds.

5. The method of claim 4, wherein the first interactive display is a Home Page and the displayed first full-motion video asset is highlighted by default in the first interactive display.

6. The method of claim 5, wherein the action includes switching to the second interactive display having screen elements adapted to display the first full-motion video asset or another selectable video asset.

7. The method of claim 1, wherein the screen data are received as binary data.

8. The method of claim 1, further comprising:
receiving, with the client, a plurality of templates, wherein:
each of the plurality of templates has a template ID and defines a layout for an interactive display of the plurality of interactive displays,
the screen data include a template ID of a template of the plurality of templates; and
generating the first interactive display comprises displaying the first full-motion video asset with the template having the template ID included in the screen data.

9. The method of claim 1, wherein the user initiates the action by activating a key on a remote control device.

10. The method of claim 9, wherein the key to be activated for initiating the action is defined by the screen data.

11. The method of claim 1, wherein at least a portion of the screen data includes control data defining a time or a geographic location limitation, wherein the control data define if the first full-motion video asset is displayed, is user-selectable, or both.

12. The method of claim 1, wherein the screen data are logically organized into a plurality of chunks, wherein different chunks of the plurality of chunks are associated with different sets of video or non-video assets.

13. The method of claim 1, wherein the screen data are logically organized into a plurality of chunks, wherein at least one of the plurality of chunks defines global resources for an interactive display of the plurality of interactive displays.

14. The method of claim 1, wherein the screen data are logically organized into a plurality of chunks, wherein at least one of the plurality of chunks defines resources for an interactive display, of the plurality of interactive displays, that changes over a defined period of time.

15. The method of claim 1, wherein at least one video feed of the plurality of video feeds is associated with a plurality of regions in each interactive display of the plurality of interactive displays, and
each of the respective plurality of full-motion video assets of the plurality of video feeds corresponds to a different region in the each interactive display.

16. The method of claim 1, wherein the screen data for the plurality of video feeds are received by the client in a combined data feed that is organized into a plurality of chunks.

17. A method for providing a video-rich navigation interface, comprising:
receiving, with a client, a plurality of video feeds, wherein each of the plurality of video feeds comprises a respective plurality of full-motion video assets, at least one of the respective plurality of full-motion video assets comprising a video being broadcast on a broadcast channel, defining a plurality of regions on a display, with each of the plurality regions being a different video asset, and wherein the full-motion video assets of the respective plurality of full-motion video assets are simultaneously received;
receiving, with the client, screen data for the plurality of video feeds, wherein the screen data define:
a first full-motion video asset of a first video feed of the plurality of video feeds as selectable by a user, and
an action to be performed in response to a selection from the user of the first full-motion video asset that belongs to a first category, and wherein:
the plurality of video feeds, the screen data, and a plurality of interactive displays for the plurality of video feeds generated based on the screen data collectively form an application, and
the action comprises accessing a second video feed of the plurality of video feeds; and
generating an interactive display for the second feed based on the screen data;
retrieving non-video assets stored in the client according to the screen data;
generating, with the non-video assets and the received respective full-motion video assets of the plurality of video feeds, a first interactive display of the plurality of interactive displays, wherein the first interactive display comprises a display of a menu option that represents a second category and a display of the respective plurality of full-motion video assets of the first video feed comprising the first full-motion video asset that belongs to the first category; and
in response to receiving a selection from the user of the menu option that represents the second category, changing the displayed first full-motion video asset that belongs to the first category to a second full-motion video asset that belongs to the second category while maintaining the display of the menu option in the first interactive display;
receiving, with the client, a selection from the user of the displayed first full-motion video asset; and
in response to the user selection of the first full-motion video asset:
accessing the second video feed and the screen data; and
generating a second interactive display displaying at least one selectable full-motion video asset of the second video feed in a position in the second interactive display determined by the screen data.

18. A system for providing a video-rich navigation interface, comprising a user equipment configured to:
receive a plurality of video feeds, wherein each of the plurality of video feeds comprises a respective plurality of full-motion video assets, at least one of the respective plurality of full-motion video assets comprising a video being broadcast on a broadcast channel, wherein the full-motion video assets of the respective plurality of full-motion video assets are simultaneously received;
receive screen data for the plurality of video feeds, wherein the screen data define:
a first full-motion video asset of a first video feed of the plurality of video feeds as selectable by a user, and
an action to be performed in response to the user selection of the first full-motion video asset that belongs to a first category, and wherein:
the plurality of video feeds, the screen data, and a plurality of interactive displays the plurality of video feeds generated based on the screen data collectively form an application; and
the action comprises accessing a second video feed of the plurality of video feeds; and
generate an interactive display for the second feed based on the screen data;

generate a first interactive display of the plurality of interactive displays, wherein the first interactive display comprises a display of a menu option that represents a second category and a display of the respective plurality of full-motion video assets of the first video feed comprising the first full-motion video asset that belongs to the first category; and in response to receiving a selection from the user of the menu option that represents the second category, change the displayed first full-motion video asset that belongs to the first category to a second full-motion video asset that belongs to the second category while maintaining the display of the menu option in the first interactive display;

receive a selection from the user of the displayed first full-motion video asset; and in response to the user selection of the displayed first full-motion video asset:
  access the second video feed and the screen data; and
  generate a second interactive display displaying at least one selectable full-motion video asset of the second video feed in a position in the display determined by the screen data.

19. The system of claim 18, wherein each of the respective plurality of full-motion video assets is selected from a live broadcast program, a VOD asset, a PPV asset, a DVR asset, a Webcast, a preview, and an advertisement.

20. The system of claim 18, wherein at least one video feed of the plurality of video feeds comprises one or more analog channels, one or more digital channels, or a combination thereof.

21. The system of claim 18, wherein the screen data comprise binary data.

22. The system of claim 18, wherein the screen data define a layout of an interactive display of the plurality of interactive displays.

23. The system of claim 18, wherein at least a portion of the screen data includes control data defining a time or a geographic location limitation, wherein the control data define if the first full-motion video asset is displayed, is user-selectable, or both.

24. The system of claim 18, wherein the screen data are logically organized into a plurality of chunks, wherein different chunks of the plurality of chunks are associated with different sets of video or non-video assets.

25. The system of claim 18, wherein the screen data are logically organized into a plurality of chunks, wherein at least one of the plurality of chunks defines global resources for an interactive display of the plurality of interactive displays.

26. The system of claim 18, wherein the screen data are logically organized into a plurality of chunks, wherein at least one of the plurality of chunks defines resources for an interactive display, of the plurality of interactive displays, that changes over a defined period of time.

27. The system of claim 18, wherein at least one video feed of the plurality of video feeds is associated with a plurality of regions in each interactive display of the plurality of interactive displays, and each of the respective plurality of full-motion video assets of the plurality of video feeds is a different region in the each interactive display.

28. A system for providing a video-rich navigation (VRN) application, comprising:

a content source configured to combine a plurality of full-motion video assets, at least one of the full-motion video assets comprising a video being broadcast on a broadcast channel, into a first video feed of a plurality of video feeds;

a VRN screen data source configured to:
  deliver screen data for the plurality of video feeds to a user equipment, wherein the screen data define:
    a first full-motion video asset of the first video feed of the plurality of video feeds as selectable by a user of the user equipment, and
    an action to be performed in response to a selection from the user of the first full-motion video asset that belongs to a first category, wherein:
    the plurality of video feeds, the screen data, and a plurality of interactive displays for the plurality of video feeds generated based on the screen data collectively form an application, and
    the action comprises accessing a second video feed of the plurality of video feeds; and wherein the user equipment is configured to:
      generate a first interactive display of the plurality of interactive displays, wherein the first interactive display comprises a display of a menu option that represents a second category and a display of the full-motion video assets comprising the first full-motion video asset that belongs to the first category, and
      in response to receiving a selection from the user of the menu option that represents the second category, change the displayed first full-motion video asset to a second full-motion video asset that belongs to the second category while maintaining the display of the selected menu option in the first interactive display;
      receive a selection from the user of the displayed first full-motion video asset; and
      in response to the user selection:
        access the second video feed and the screen data; and
        generate a second interactive display displaying at least one selectable full-motion video asset of the second video feed in a position in the second interactive display determined by the screen data.

* * * * *